US005313404A

United States Patent [19]

Wu

[11] Patent Number: 5,313,404

[45] Date of Patent: May 17, 1994

[54] AUTOMATIC POSTAL TELLER MACHINE

[76] Inventor: Sheng J. Wu, P.O. Box 1-79, Taipei, Taiwan

[21] Appl. No.: 536,496

[22] Filed: Jun. 11, 1990

Related U.S. Application Data

[63] Continuation-in-part of Ser. No. 920,648, Oct. 20, 1986, Pat. No. 4,940,887.

[51] Int. Cl.$^5$ .............................................. G06F 15/20

[52] U.S. Cl. .................................... 364/478; 364/466; 364/464.03

[58] Field of Search ...................... 364/464.03, 464.02, 364/478, 466, 479; 197/49; 235/61.9 A; 177/210, 53, 5, 4

[56] References Cited

U.S. PATENT DOCUMENTS

| | | | |
|---|---|---|---|
| 3,290,491 | 6/1961 | Wahlberg | 364/463.03 |
| 3,613,808 | 10/1971 | Bunnelle | 177/53 |
| 4,024,380 | 5/1977 | Gunn | 235/61.9 A |
| 4,051,942 | 10/1977 | Suzuki et al. | 197/49 |
| 4,319,328 | 3/1982 | Eggert | 364/466 |
| 4,488,610 | 12/1984 | Yankloski | 177/4 |
| 4,495,581 | 1/1985 | Piccione | 364/466 |
| 4,516,209 | 5/1985 | Scribner | 364/466 |
| 4,579,213 | 4/1986 | Rhine et al. | 364/479 |
| 4,584,648 | 4/1986 | Dlugos | 364/464 |
| 4,595,984 | 6/1986 | Daniels | 364/466 |
| 4,923,022 | 5/1990 | Hsieh | 364/464.03 |
| 4,940,887 | 7/1990 | Sheng-Jung | 364/464.03 |
| 5,065,000 | 11/1991 | Pusic | 364/463.03 |

*Primary Examiner*—Jerry Smith
*Assistant Examiner*—Jim Trammell
*Attorney, Agent, or Firm*—Lalos & Keegan

[57] ABSTRACT

An automatic postal teller machine capable of automatically performing the postal operation in an unmanned condition, the operation procedure thereof including auto-conveying, auto-weighing, auto-postage calculation, auto-fast postal stamp adjusting, auto-money identification, auto-money receiving, auto-money coin changing, auto-stamping, auto-mail classification, auto-ZIP code printing and auto-data recording, wherein by means of commands of a microcomputer, whole mail-processing operation of each mail can be completed in about several seconds.

29 Claims, 22 Drawing Sheets

AUTOMATIC POSTAL TELLER MACHINE

This is a continuation-in-part of copending application Ser. No. 920,648, filed on Oct. 10, 1986, now U.S. Pat. No. 4,940,887.

BACKGROUND OF THE INVENTION

The present invention relates to an automatic mail-processing machine, and more particularly to an intelligent automatic postal teller machine capable of automatically performing postal operations in an unmanned condition, such as mail conveying, weighing, postage calculation, postage stamp adjusting, money identification, money receiving, coin changing, stamping, mail classification, ZIP code printing, data recording and mail returning due to insufficiency of postage or change of mail plan.

When mailing an item of mail, the mailer must go through weighing, postage calculation, buying the stamp, attaching the stamp ot the item, and then dropping the item into the posting box, etc. The dispatched mail item must thereafter be checked for over-weight, postage due, and then stamped, sorted, etc, resulting in a large amount of work. However, the aforesaid procedures have been in use for a long time, and although the post administrations of various countries have tried to improve the defective operation, no innovations have been made.

SUMMARY OF THE INVENTION

Therefore, it is a primary object of this present invention to provide an automatic postal teller machine which can perform the functions of receiving, conveying, and weighing mail, calculating postage, adjusting the postage stamp, money identification, money receiving, coin changing, stamping, mail classification, ZIP code printing, and data recording. All the above functions are controlled by a microcomputer and performed in an unmanned condition.

It is a further object of this invention to provide the above postal teller machine, wherein the mail is weighed during conveyance, and the postage and data stamp device is operated by commands of a microcomputer.

It is still a further object of this invention to provide the above postal teller machine, wherein the postage adjusting, setting, changing, etc. operations are completely controlled by programs which can be modified in accordance with changes in postage policy.

It is still a further object of this invention to provide the above postal teller machine, wherein the functions of every inner operation units are all controlled and monitored by the microcomputer so that any failing unit can be diagnosed automatically and displayed on a computer display, and if a moden is added, the signals can be sent to general post office wirelessly or wiredly so that the general monitor center can control the operation state of this invention.

It is still a further object of this invention to provide the above postal teller machine, which can automatically print out the ZIP codes on the mail item according to the input ZIP codes whereby the general post office can classify the mail item into different groups by means of a code identifying machine so as to save a great deal of labor and time and speed the delivery.

BRIEF DESCRIPTION OF THE DRAWINGS

FIGS. 5A through 5D are flow charts of operation of the present invention;

DETAILED DESCRIPTION OF THE PREFERRED EMBODIMENT

Figure 1:
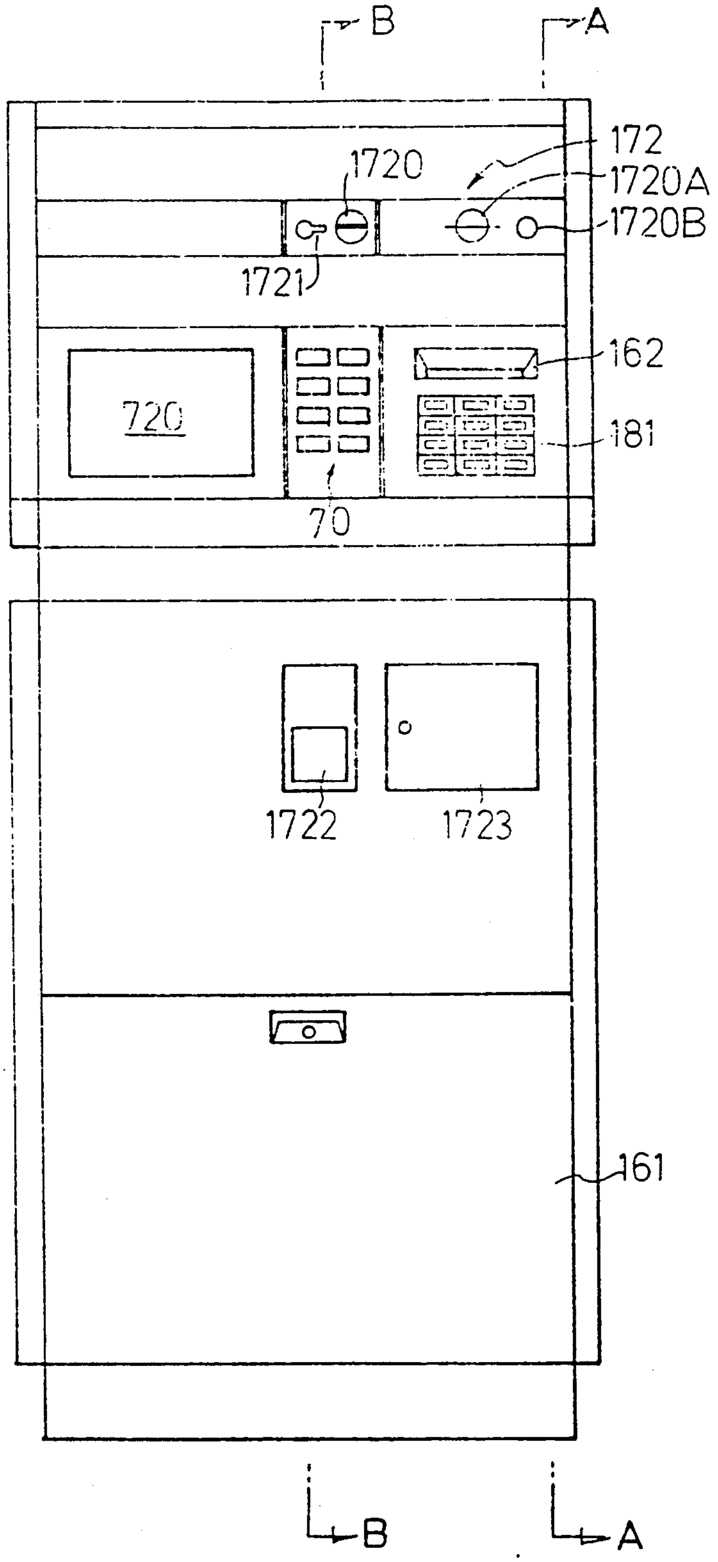
FIG. 1 is a front view of the present invention.
Figure 2:
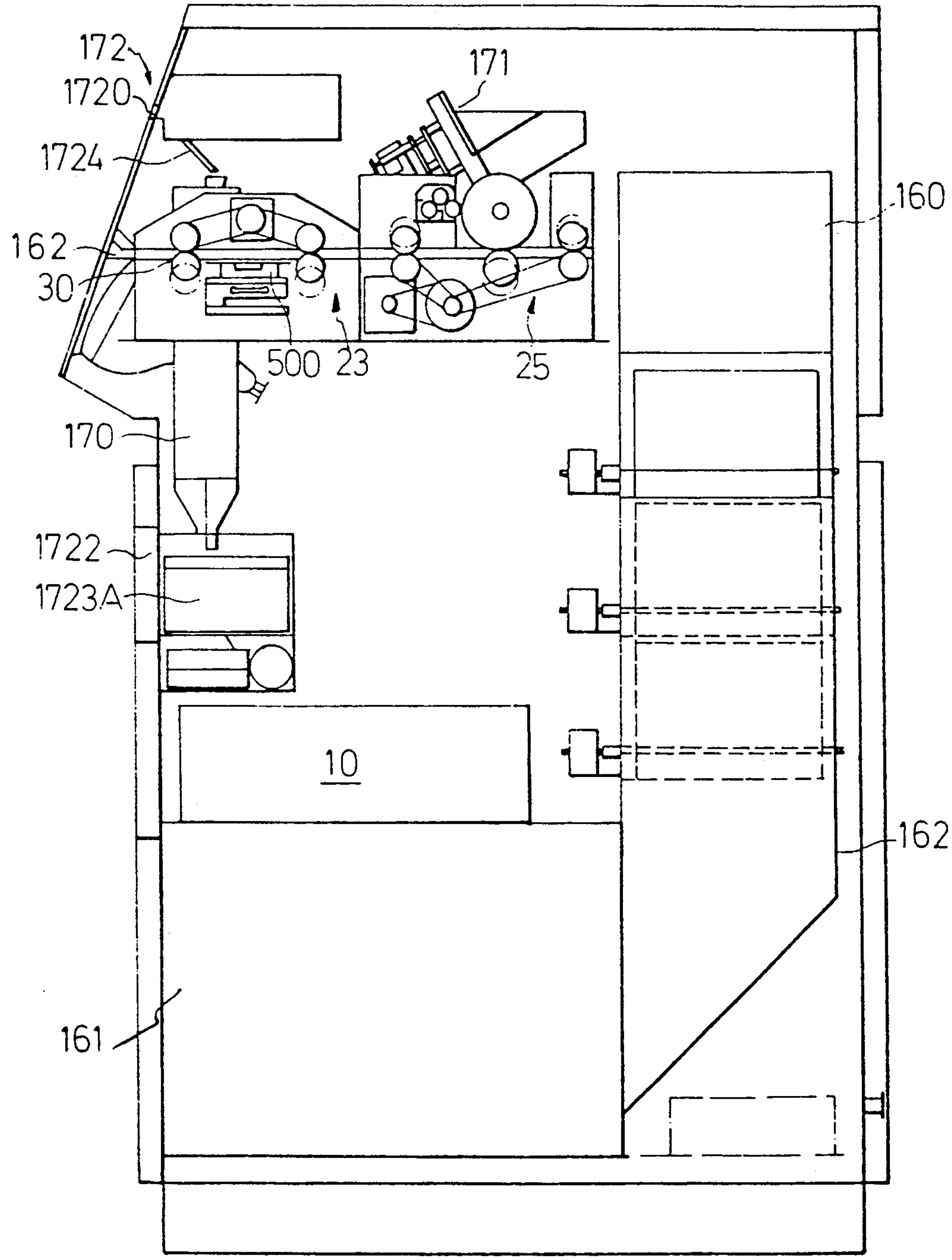
FIG. 2 is a sectional view taken on A—A line of FIG. 1.
Figure 3:
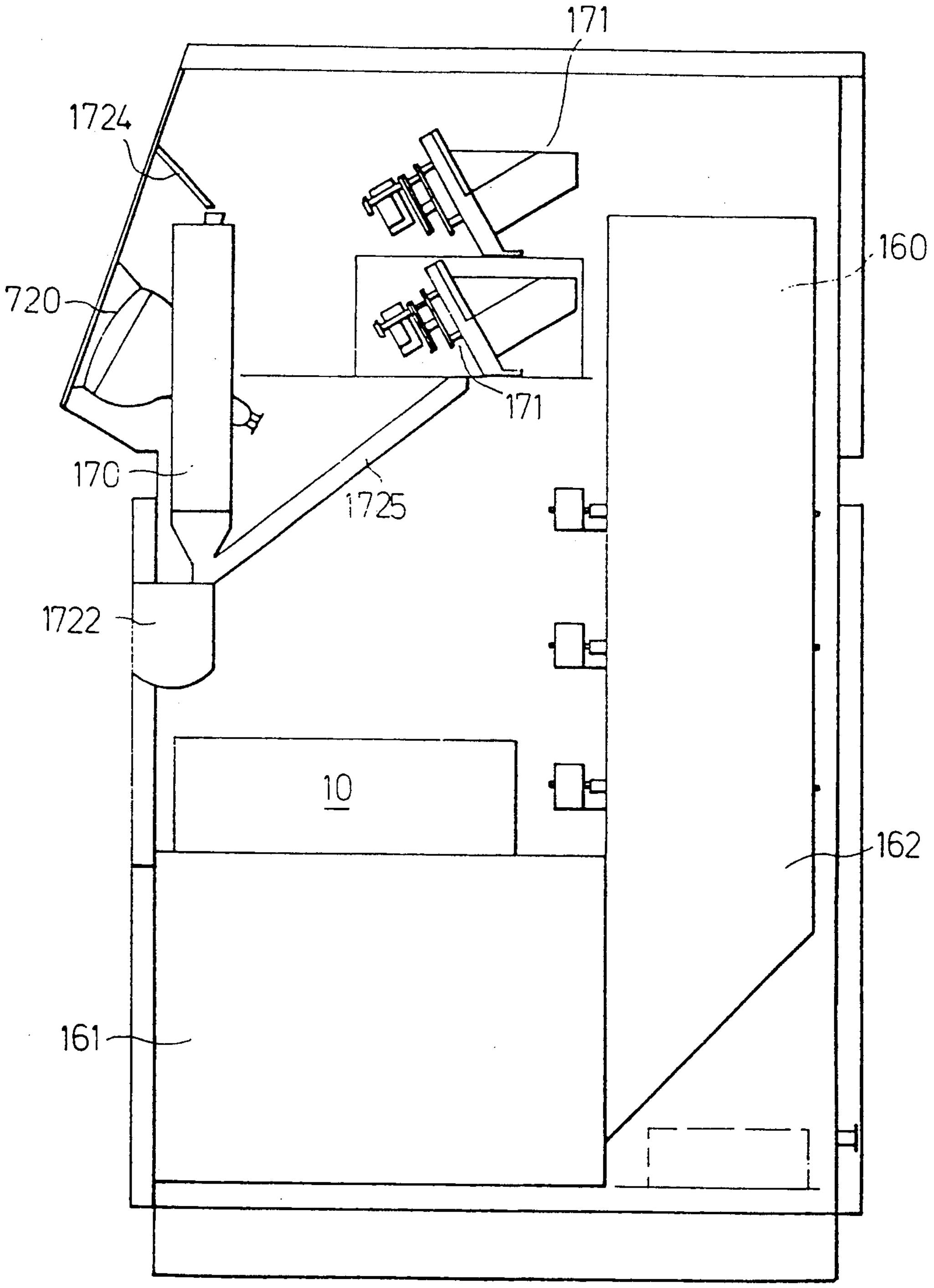
FIG. 3 is a sectional view taken on B—B line of FIG. 1.

Referring to the drawings, and particularly to FIGS. 1–3, the automatic postal teller machine of the present invention primarily includes a housing, a main processor 10, a display 720, a key-in system 70, an automatic conveying and weighing device 23 (including automatic conveying device 30 and automatic weighing device 500), an automatic postage stamp device 25, an automatic mail classifying device 160, a coin identifying device 170, a money receiving device 172 and a coin changing device 171. In one preferred embodiment of this invention, the display 720 is located at an upper front portion of the housing, and a coin slot 1720 is located rightward above the display 720, and a money card slot 1720A is located at right side of the coin slot 1720, while at left side thereof is located a coin return button 1721. The key-in system 70 is disposed on the right side of the display 720 and includes an ordinary mail button 71, special delivery button 72, air mail button 73, domestic mail button 79, etc. A mail drop 162 is disposed on the right side of the key-in system 70, while a coin returning opening 1722 is located under the key-in system 70. A money box door 1723 is located beside the coin return opening 1722 for taking out a money box 1723A. A relatively large mail storing box 161 is located at a lower portion of the housing, and the microprocessor 10 is disposed above the mail storing box 161 (see FIG. 2). Behind the mail drop 162 are disposed the automatic conveying and weighing device 23 and the postage stamp device 25. Behind the postage stamp device 25 is the mail classification device 160. A slant mail classifying guide passage 162 goes into the mail storing box 161, and a slant coin passage 1724 behind the coin slot '1720 goes toward the coin identifying device 170, as shown in FIG. 3. Below the coin identifying device 170 is disposed the changing and coin returning opening 1722. A false coin can be identified by the coin identifying device 170 and guided to the coin return opening 1722. In addition, a change supplement inlet 1710 (not shown) is disposed on a top portion of the housing and communicates with the coin changing device 171, whereby the change can goes through a slant change passage 1725 into the changing and coin return opening 1722. It should be noted that the coin identifying device 170, coin changing device 171 and mail classifying device 160 used in this invention are well known in the prior art, and therefore the description thereof is omitted.

Figure 4A:
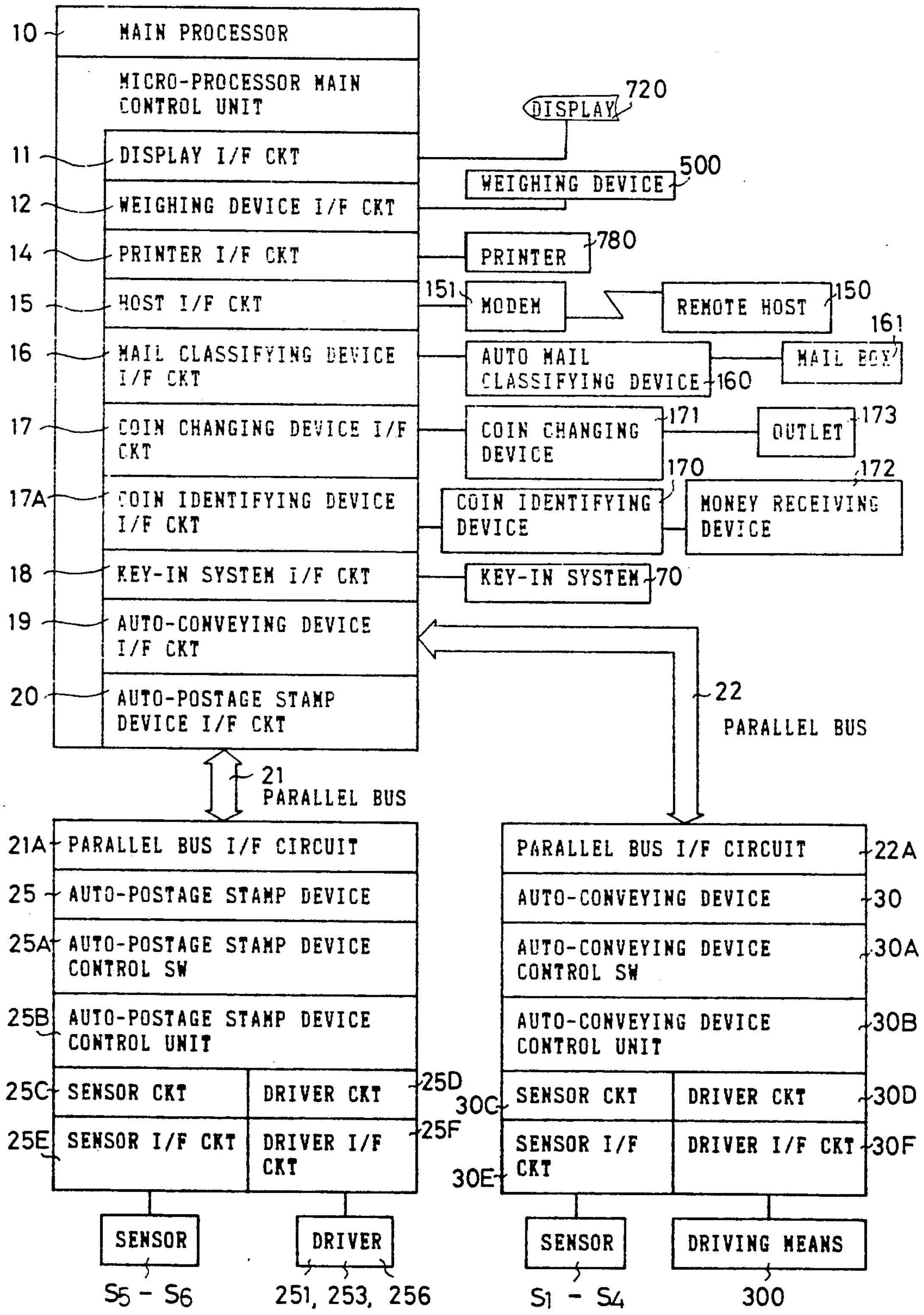
FIGS. 4A through 4D are system block diagrams of four embodiments of the present invention.
Figure 4B:
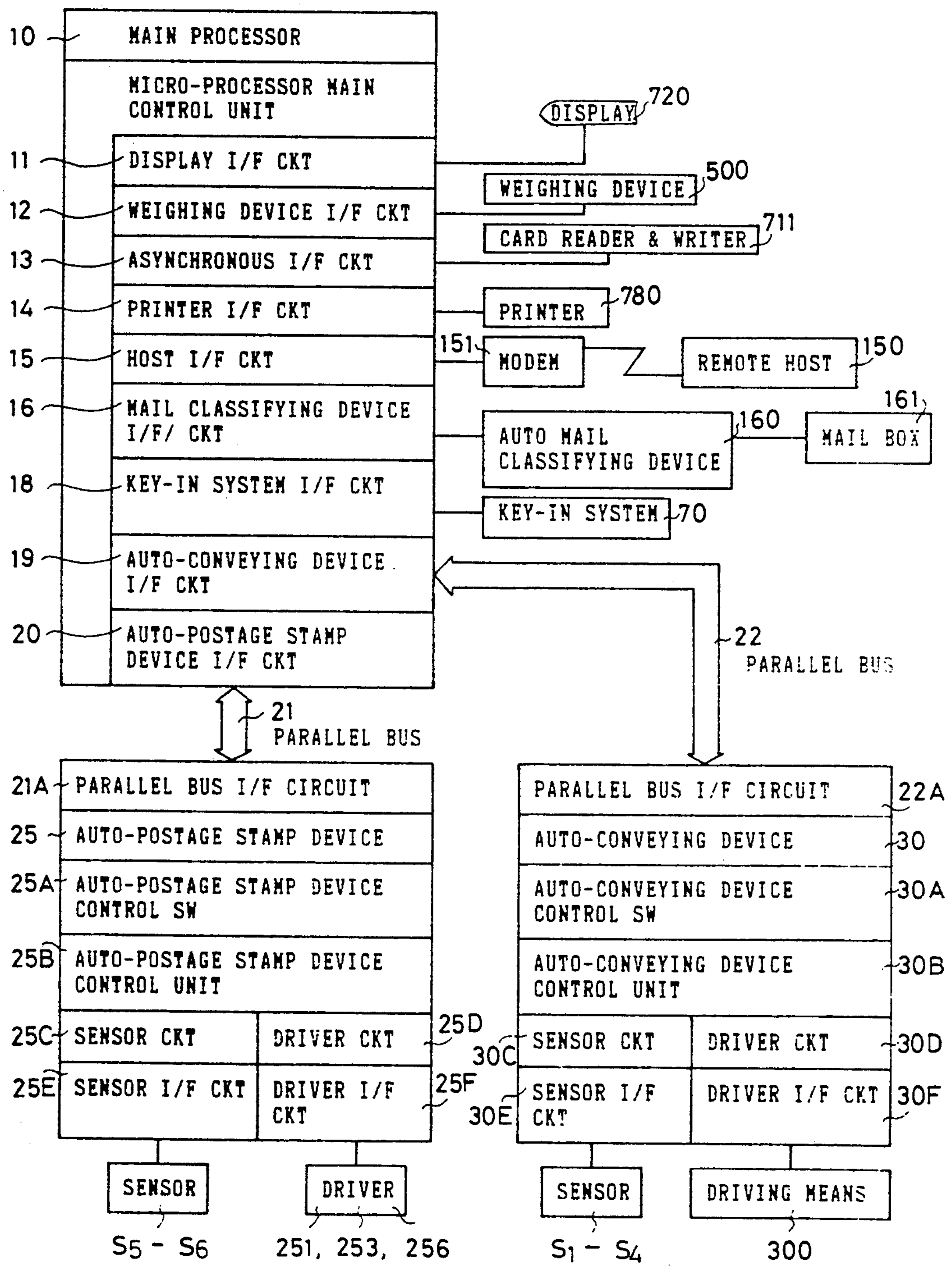
Figure 4C:
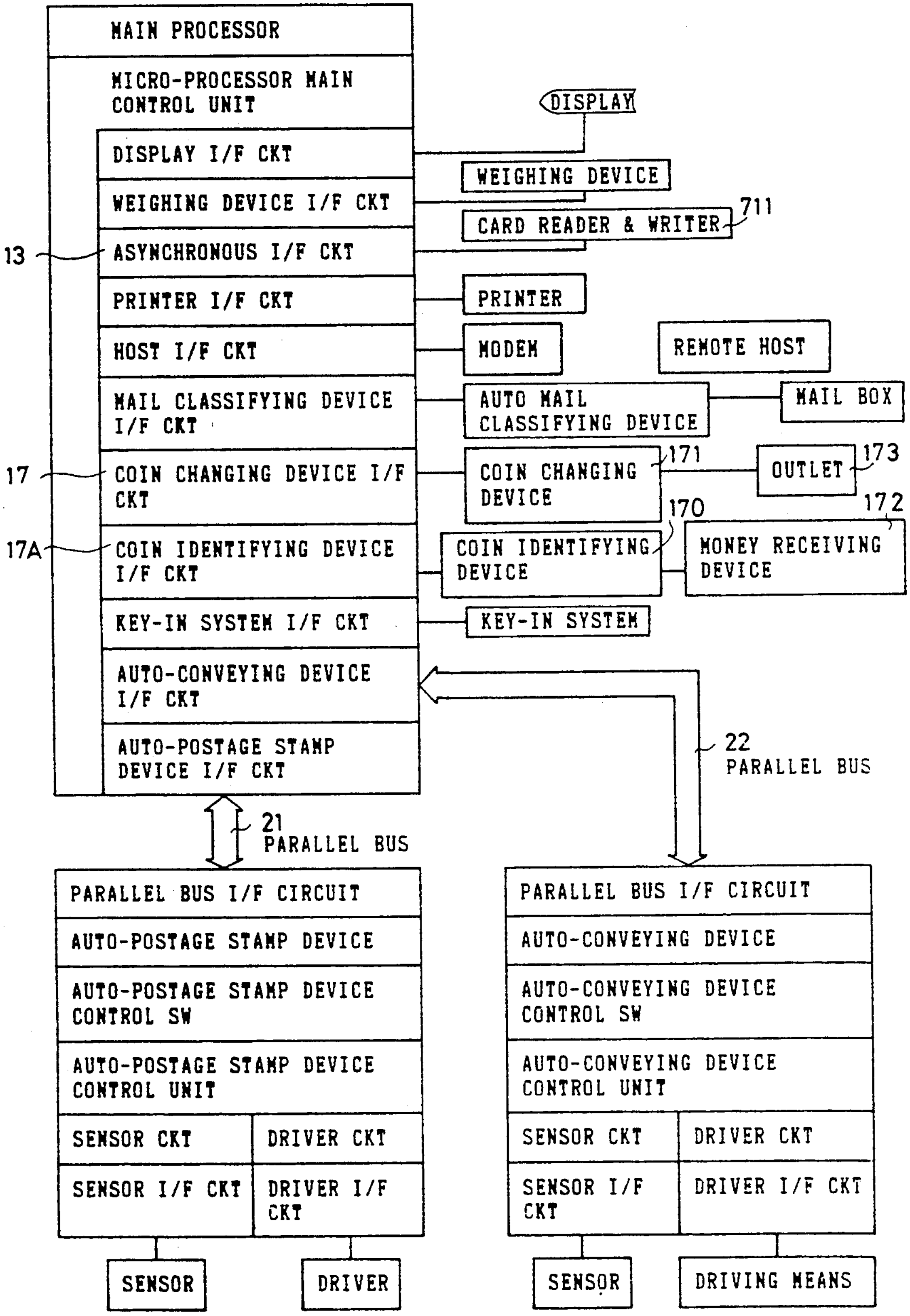

Please now refer to FIGS. 4A through 4D, wherein FIG. 4A shows a postal teller machine system of this invention utilizing coins and FIG. 4B shows a system utilizing money card, while FIG. 4C shows a system utilizing both money card and coins. As shown in FIG. 4A, the system utilizing coins primarily includes a main processor 10, a display 720, a weighing device 500, a mail classifying device 160, a coin identifying device 170, a coin changing device 171, a printer 780, a key-in system 70, an automatic conveying device 30 and an automatic postage stamp device 25, wherein the main processor 10 includes a display interface (I/F) circuit 11, a weighing device I/F circuit 12, a mail classifying device I/F circuit 16, a coin changing device I/F circuit 17, coin identifying device I/F circuit 17A, a printer I/F circuit (CKT) 14 commanding the printer 780 to work, a key-in system I/F CKT 18 capable of receiving commands from key-in system 70 and communicating therewith, an auto-conveying device I/F CKT 19 used to control auto-conveying device 30 and receive signals therefrom and communicate therewith, a parallel bus 22 related to the auto-conveying device I/F CKT 19, a parallel bus I/F CKT 22A, a postage stamp device I/F CKT 20 used to control auto-postage stamp device 25 and receive signals therefrom and communicate therewith, and a parallel bus 21 related to the postage stamp device I/F CKT 20 and a parallel bus I/F CKT 21A. As shown in FIG. 4A, the postage stamp device 25 includes a postage stamp device control switch (SW) 25A, a postage stamp device control unit 25B, a sensor CKT 25C, a sensor I/F CKT 25E, a sensor S5, S6, a driver CKT 25D, a driver I/F CKT 25F and a driver 251, 253, 256, etc. The auto-conveying device 30 includes an auto-conveying device control SW 30A, an auto-conveying device control unit 30B, a sensor CKT 30C, a sensor I/F CKT 30E, a sensor S1–S4, a driver CKT 30D, a driver I/F CKT 30F and a driver 300, wherein the auto-postage stamp device 25 transmits the signals obtained by sensors S5, S6 through the sensor I/F CKT 25E, sensor CKT 25C to auto-postage stamp device control unit 25B, auto-postage stamp device control SW 25A, and then the signals are converted into effective commands via the programs of the microprocessor and sent to the driver CKT 25D, driver I/F CKT 25F to command the drivers 251, 253, 256 to operate in accordance with the commands. The auto-conveying device 30 also transmits the signals obtained by sensors S1–S4 through the sensor I/F CKT 30E, sensor CKT 30C to the auto-conveying device control unit 30B, auto-conveying device control SW 30A, and then the signals are converted into effective commands via the programs of the microprocessor and sent to the driver CKT 30D and driver I/F CKT 30F to command the driver 300 to operate according to the command.

It should be noted that a modem 151 and a remote host 150 can be added to the above system, and a host I/F circuit 15 can be correspondingly added to the microprocessor so as to on-line connect with a general post office wirelessly or wiredly so that the general monitor center can control the operation state of the system.

In an area where money card are widely used, the money receiving device 172 can be replaced with a card reader/writer 711, and an asynchronous I/F circuit 13 can be correspondingly added to the microprocessor, as shown in FIG. 4B. In this case, the coin identifying device 170 and the relevant I/F circuit can be deleted.

In FIG. 4C, a system utilizing both coins and money card is shown. The user can use coins or money card to pay the postage as desired.

Figure 4D:
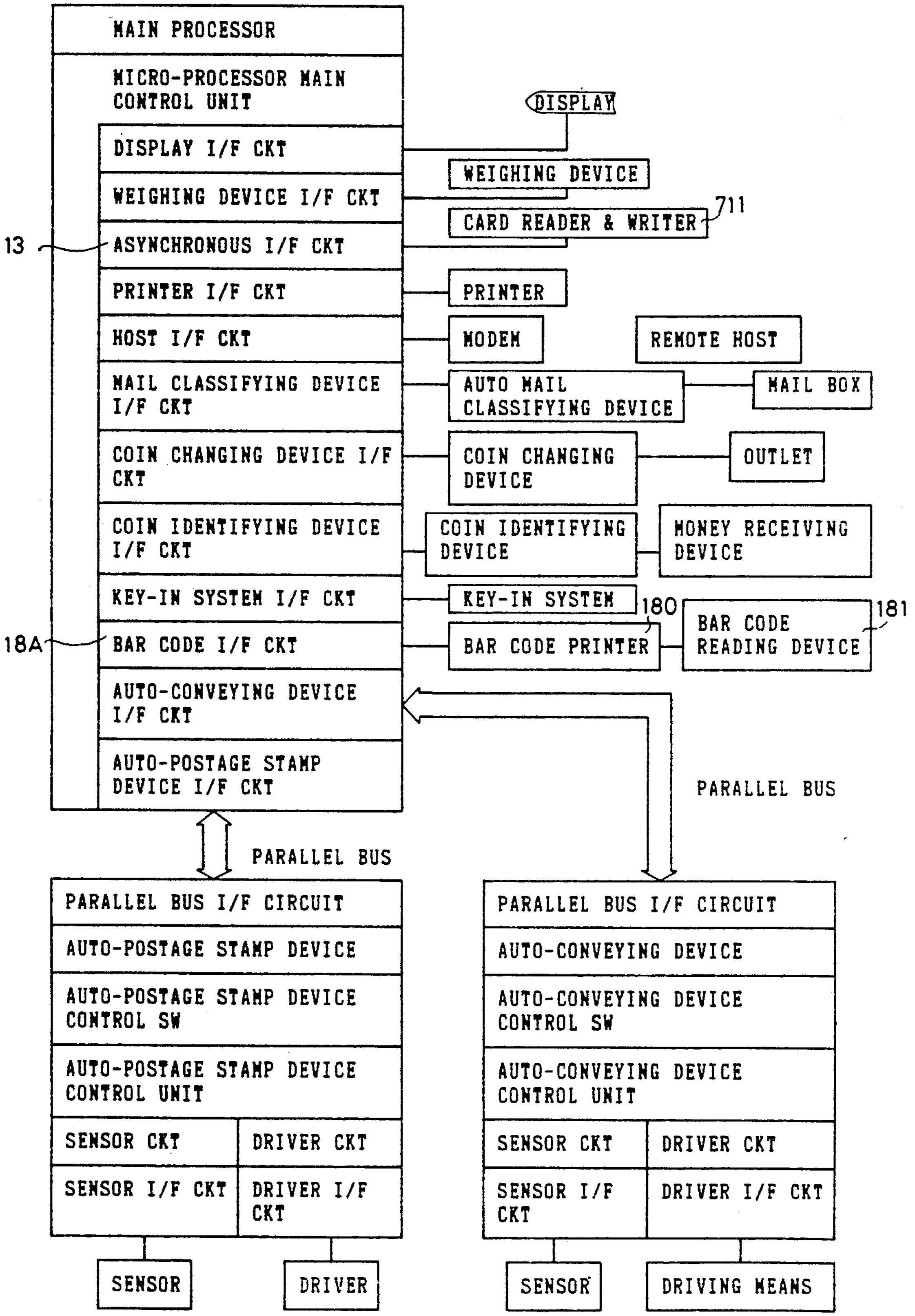

As to the system shown in FIG. 4D, it is identical to the system of FIG. 4C except a bar code printer 180 and bar code reading device 181 are added, and a bar code I/F circuit 18A is correspondingly added to the microprocessor. Thereby, the user can put the ZIP code on the mail envelope to be read by the bar code reading device 181 and the bar code printer 180 will print the ZIP code on proper portion of the mail envelope, permitting the bar code identifying device to sort the items according to their ZIP codes so that a great deal of labor and time are saved and the delivery speed is quickened.

Figure 5A:
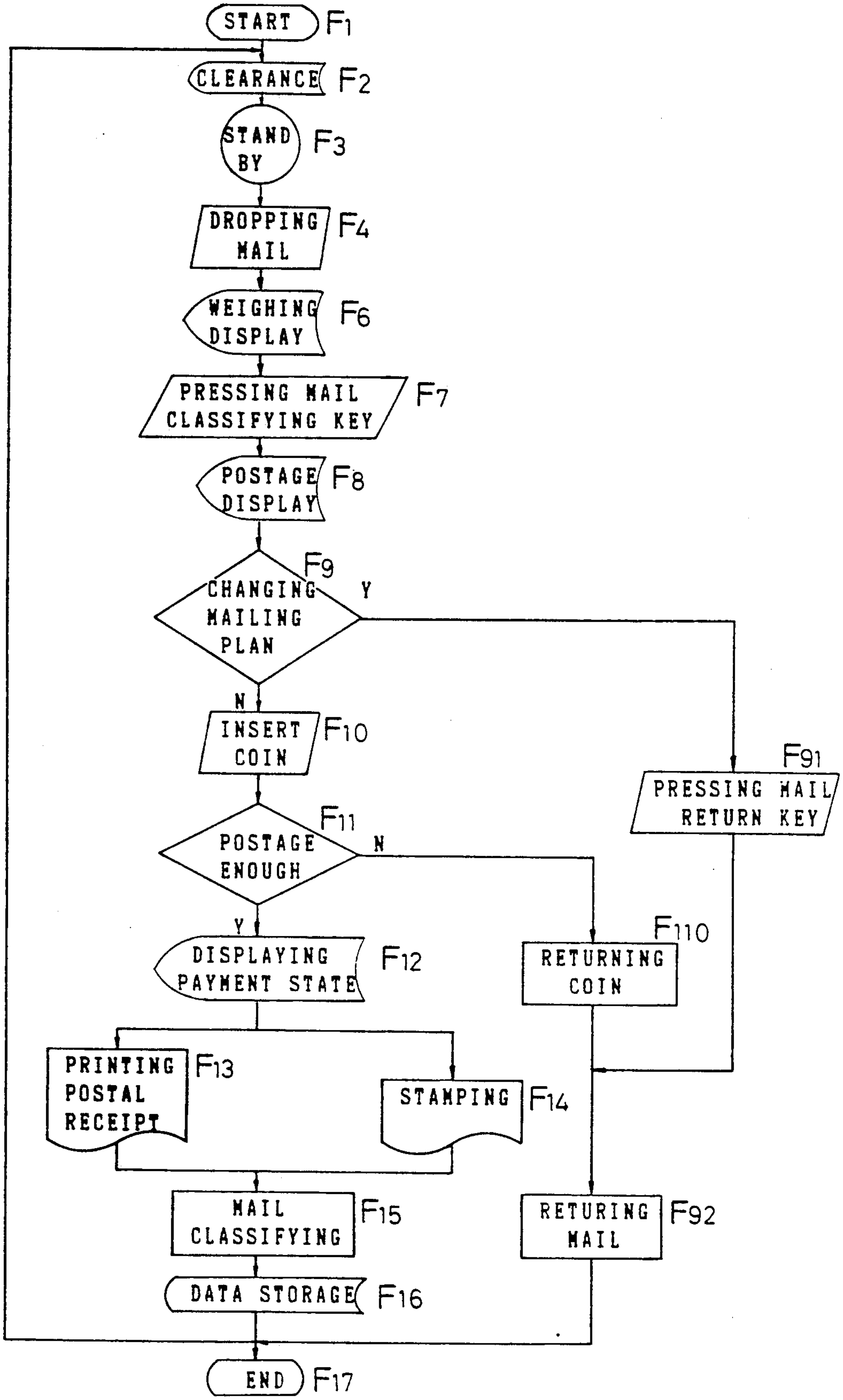
Figure 5B:
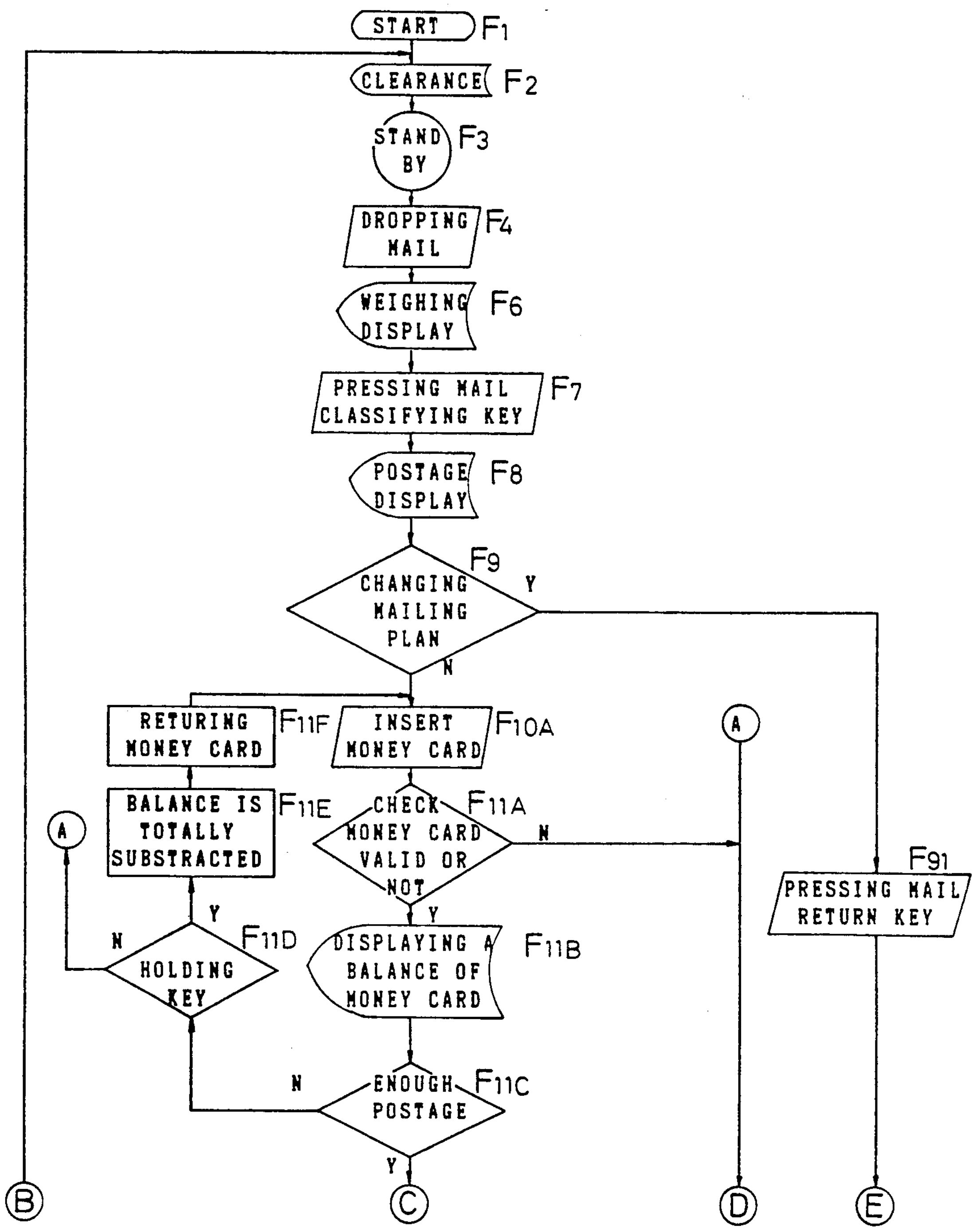
Figure 5B:
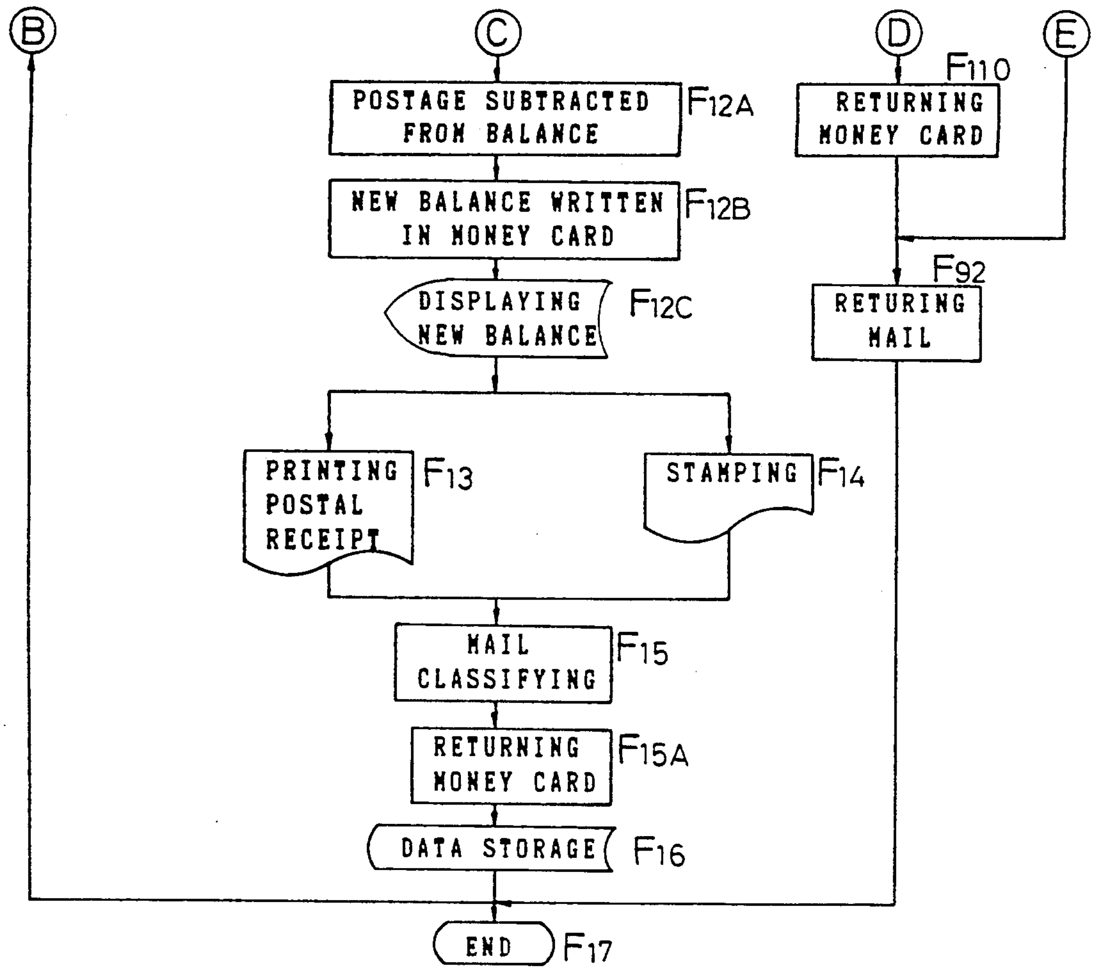
Figure 5C:
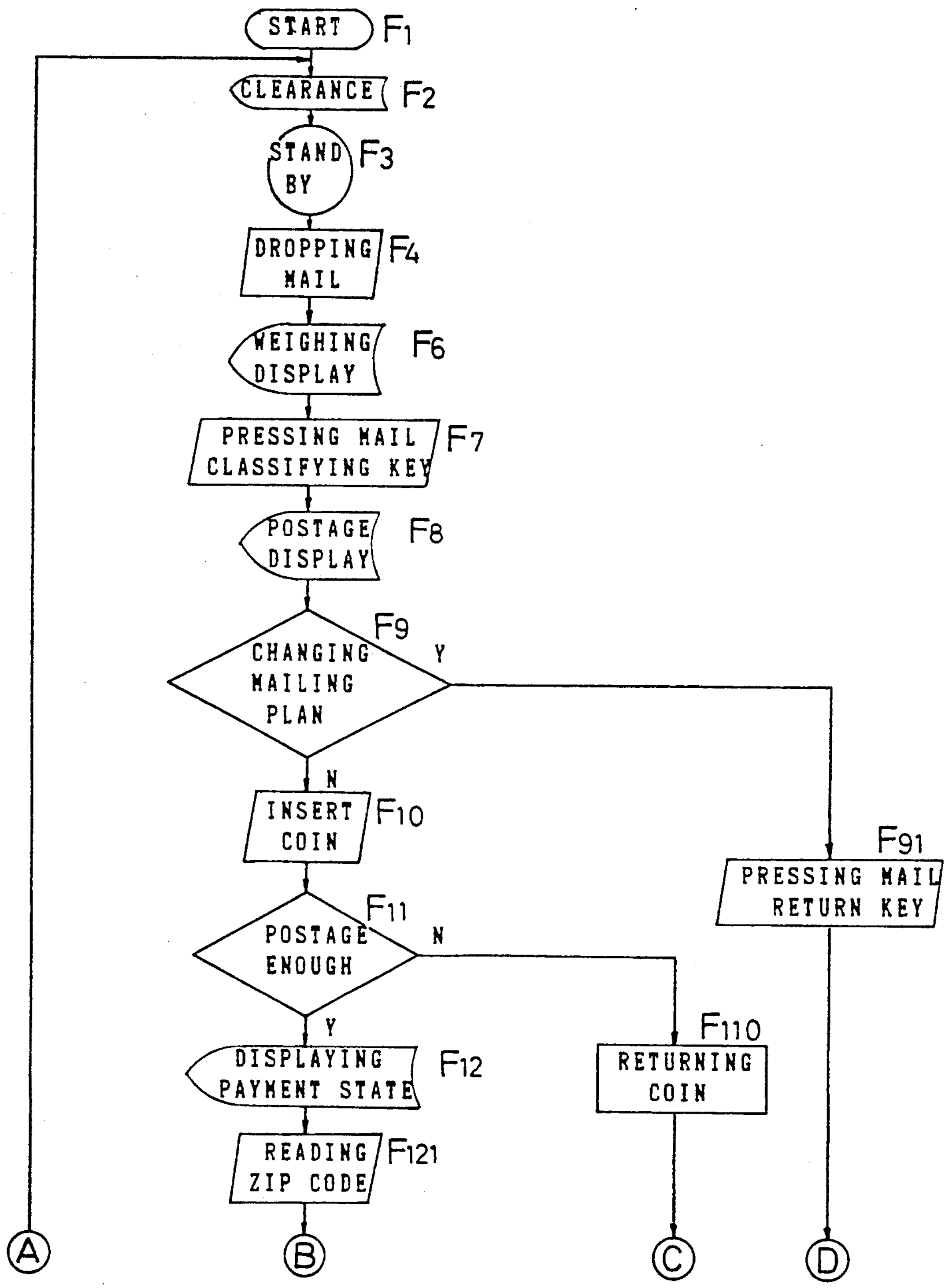
Figure 5C:
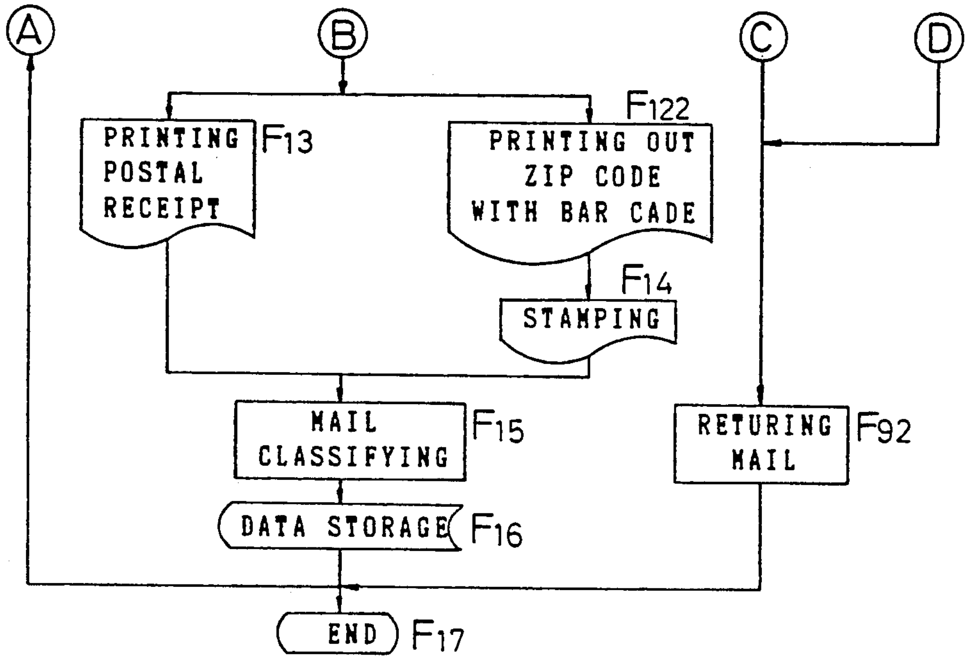

Please now refer to FIGS. 5A through 5C, wherein the operation of this invention is described in a flow chart. There are two ways by which the system of this invention can be operated, one of which is by coin payment (FIG. 5A), and the other of which is by money card payment (FIG. 5B).

First referring to FIG. 5A, the operation procedure of this invention starts from F1, and then goes to clearance F2, stand by F3, and dropping the mail into the mail drop 162 F4. At this time, the mail is carried to the weighing device 500 by the automatic conveying device 30 for weighing. The procedure then goes to F6. At this time, the user can see the weight of the mail from the display 720 Then, in F7, the user presses one of the mail classifying keys 71 through 79 of the key-in system 70 according to the instruction of microprocessor. Thereafter, in F8, the microprocessor will according to the weight signal sent from the weighing device 500 and the classification of the mail calculate the postage due and display the same on the display 720. In F9, if the mailer decides not to send the item, he/she can press the mail returning key 79, whereupon the item is immediately returned, and in F91, F92 the item will then be returned to the mail drop 162 by the automatic conveying device 30 in a reverse direction. Alternatively, if the user wishes to continue and presses the appropriate key of the key-in system in response to microprocessor, then in F10, the microprocessor will instruct the user via the display to insert the coins. The inserted coins are identified by money identifying device 170 and the amount of money inserted will be displayed on the display. In F11, the user will be told if the amount is enough for paying the postage, and in case the user does not insert enough coins in a certain time, the item will be returned, and the inserted coins will be returned by means of pressing the coin returning button 1721. The procedure then goes to F17 and ends. If excessive amount of coins are inserted, then the coin changing device 171 will return the change to the coin returning opening 1722. In F12, the display 720 will show the payment state, and the item will be conveyed to the postal stamp device 25 for stamping in F14. The postage receipt will then be released from the printer 780 in F13. The stamped mail will be sent to the mail classifying device 160 in F15 from the rear side of the postal stamp device 25, and enter the mail storing box 161 as shown in FIG. 2. The payment data of the mail is then stored in the microprocessor in F16 and can be printed out by the printer if necessary. The procedure then ends at F17.

As shown in FIG. 5B, is a money card is used, the procedure will go from F9 to F10A. The user can insert the money card into the money card insert slot 1720A as shown in FIG. 1. The card reader/writer (see FIG. 4B) will then determine if the money card is valid in F11A. If the money card is not valid, the procedure goes to F11O and F92 and the money card and the are returned. If the money card is valid, then the balance of the money card is shown by the display 720 in F11B. If the balance is determined to be enough for the postage in F11C, then the postage will be subtracted from the balance in F12A, and new balance is written in the money card in F12B. The new balance is shown on the display 720 F12C and the preceding F13, F14 and F15 repeat to return the money card. The procedure then goes from F15 to F15A, F16 and F17 and ends. If in F11C, when paying the postage, it is found that the balance is insufficient to pay the postage, then the procedure goes to F11O as shown in FIG. 5A to return the mail. If the user wants to use coins to pay the difference, he/she can press the hold-on key 1720B (see FIG. 1), and the procedure goes from F11D to F11E, i.e. the balance is totally subtracted and the money card is returned and the preceding steps repeat. The procedure goes from F11E to F11F, then to F10 (see FIG. 5A) or F10A and ends.

The flow chart of another embodiment of this invention is shown in FIG. 5C, wherein in F12, the display 720 displays the payment state, and in F121, the ZIP code shown on the mail envelope will be read by bar code reading device 181 (please refer to FIGS. 1 and 4D). Thereafter, the system will print out the receipt and the ZIP code and complete the stamping. The procedure goes from F13, F122 to F14, F15, F16 and F17 and ends.

Of course, the steps F121 and F122 can be added between steps F12C and F14 of FIG. 5B so that the system applying money card can also print ZIP code on the mail.

It should be noted that in the above procedure, the ZIP code printing step precedes the stamping step. However, in practical use, this arrangement can be changed according to actual requirement.

Figure 6:
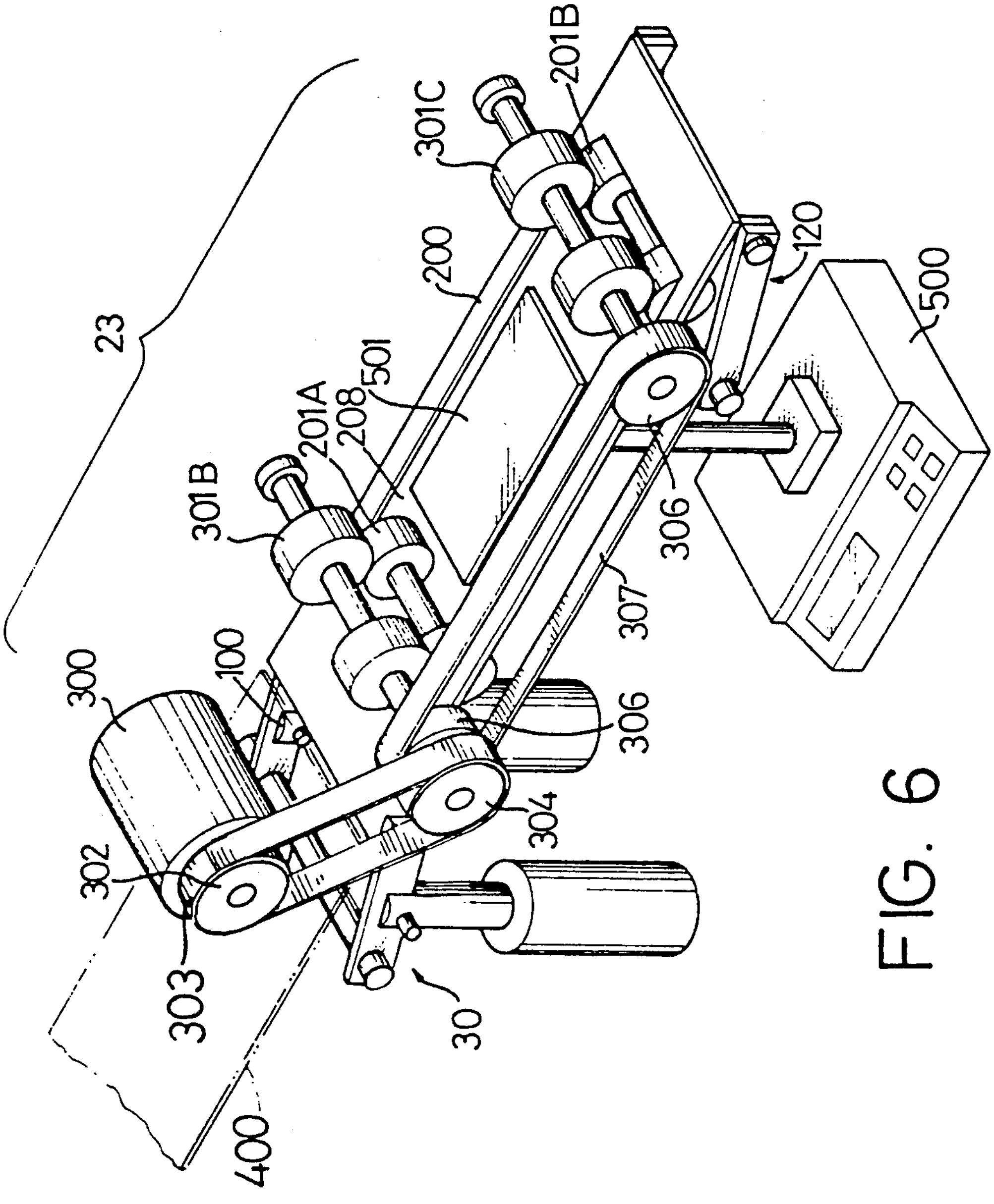
FIG. 6 is a perspective view of the automatic weighing device thereof.
Figure 7:
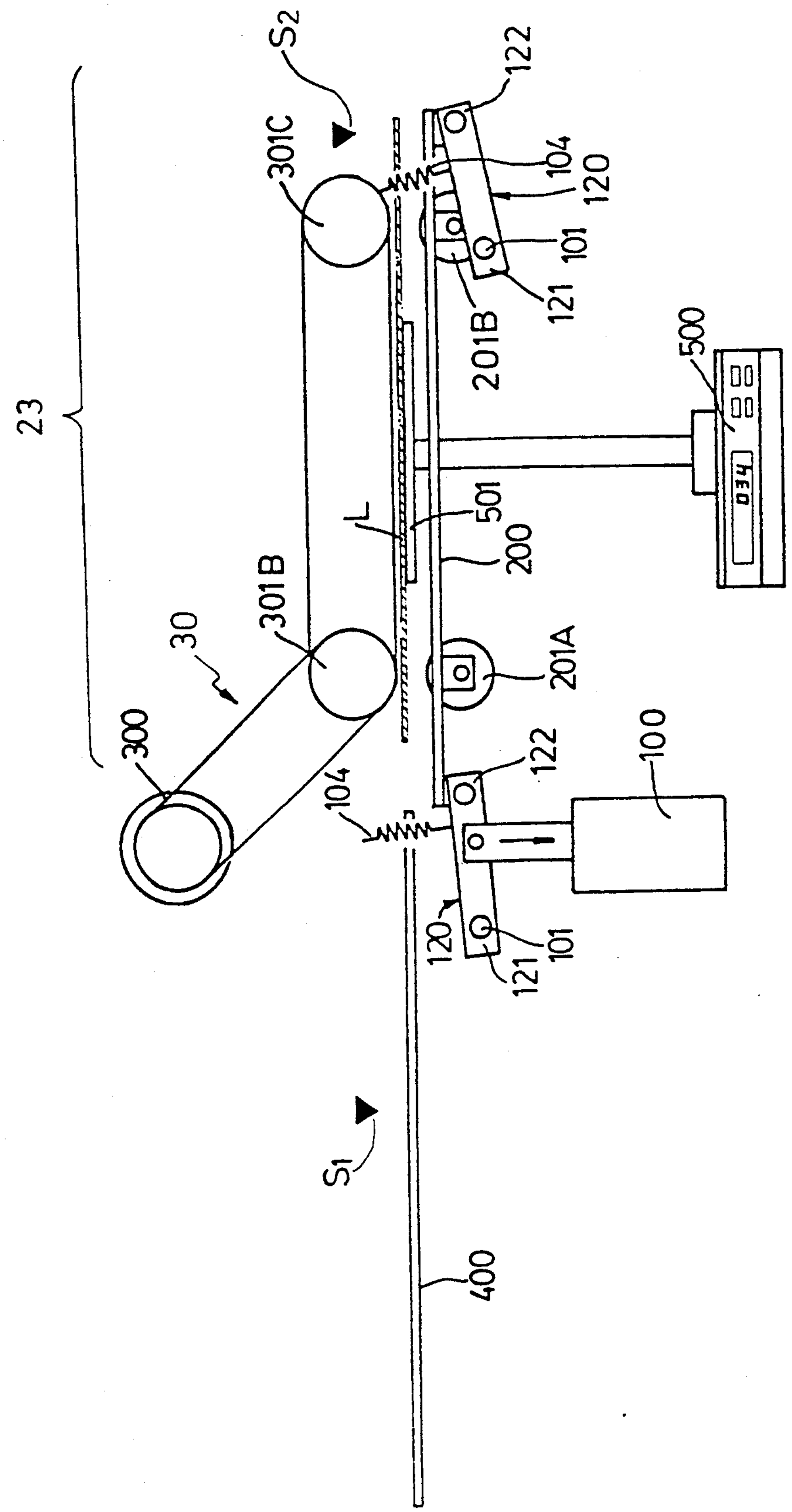
FIG. 7 is a side view in accordance with FIG. 6, showing a mail weighed during conveyance.

To better understand the mail-processing operation of the present invention, two main portions thereof, i.e. automatic weighing device for conveyed mail and automatic postal stamp device are described in detail as follows:

Referring to FIGS. 6 and 7, one embodiment of the automatic weighing device 23 for postal material in conveyance according to the present invention is illustrated. As shown in FIG. 6, the device 23 of the present invention comprises a conveying device 30 and a weighing scale 500, wherein the conveying device 30 includes a driving means 300, for example, a motor, a first conveying means 301B and a corresponding first idle wheel 201A thereof, a second conveying means 301C and a corresponding second idle wheel 201B, a fixed stand 400 (FIG. 7), a movable stand 200, and a weighing scale 500 located under the movable stand 200, and a first sensor S1 located before the first conveying means 301B (see FIG. 7) and a second sensor S4 located after the second conveying means 301C.

A novel aspect of the present invention is the movable stand 200 that includes a supporting stand with a rectangular opening 208 in the middle portion thereof. At both ends of the opening 208 are disposed the first and second idle wheels 201A and 201B that are in cooperative relationship with the first and second conveying means 301B and 301C respectively to convey a standard mail item such as a letter L to be weighed.

A movable end 122 of each of a pair of front and rear rocking arms 120 is pivotally connected at each end of the movable stand 200. The other end of each rocking arm 120 is pivotally connected at a pivot 102. A pair of electromagnetic actuators 100, such as a solenoid, are connected to the middle portion of the front rocking arm 120. When the electromagnetic actuator 100 is activated, the movable end 122 is pulled down with the pivot 101 as a fulcrum. Since the moving stand 200 is attached to the movable ends 122 of both of the rocking arms 120, both movable ends 122 are actuated and descend simultaneously to move stand 200 to a lower horizontal plane. The first and second idle wheels 201A and 201B are connected to move with the movable stand 200 in vertical planes corresponding to the first and second conveying means 301B and 301C, respectively. The first conveying means 301B precedes the second conveying means 301C. The driving means 300, e.g. a stepping motor, drives the first, second conveying means. The first conveying means 301B is urged by a first pulley 302 (FIG. 6) and a first conveying belt 303 thereof. Referring again to FIG. 6, the first and second conveying means 301B, 301C are urged by second pulley 304, a second conveying belt 307 and third pulley 306.

Disposed beneath the opening 208 of the movable stand 200 is the weighing scale 500. A weighing plate 501 of the weighing scale 500 is positioned above the main body of the weighing scale with its surface a little lower than the movable stand 200 so that the weighing plate 501 does not obstruct the conveyance of the article to be weighed.

The operation of the weighing device 23 of the present invention can best be understood by referring to FIGS. 6 and 7. Prior to reaching the first conveying means 301A and first idle wheel means 310, letter L comes in contact with the first sensor S1, such as photosensor, and the driving means 300 is actuated to convey letter L to a weighing position, as shown in FIG. 6 (initial position) FIG. 7 (weighing position). In the positions shown in FIG. 6, the electromagnetic actuator 100 is not activated. Therefore, the movable ends 122 of the rocking arms 120, due to the force of the springs 104, urge the first and second idle wheels 201A, 201B upward and in close contact with the first and second conveying means 301B, 301C, whereby the letter L can be delivered onto the movable stand 200 as shown in FIG. 7.

When the letter L reaches the front edge of the second sensor S2 the second sensor S2 sends a sensor signal to actuator 100. The electromagnetic actuator 100 is thereby activated and the movable end 122 of the related rocking arm 120 is pulled down lowering movable stand 200 and the movable end of the other rocking arm. The letter L to be weighed is then seated on the weighing plate 501 of the weighing scale 500, as illustrated in FIG. 7. The weighing scale can weigh the letter L, and display the result on the display means 720 via microprocessor 10 or send out a signal to perform some other control functions.

After a pre-set time period following measurement of the object's weight, the electromagnetic actuator 100 will be deactivated, and both rocking arms 120 are drawn back by the force of the springs 104 and the movable stand 200 is restored to its initial position. The letter L, having been weighed, is again held between the first and second idle wheels 201A, 201B and the first and second conveying means 301B, 301C, and thus continues to be conveyed into the postage stamp device 25.

Another embodiment of the automatic weighing device of this invention is shown in FIG. 8. The automatic weighing device 23 also includes an automatic conveying device 30 and a weighing scale 500, wherein the automatic conveying device 30 includes a driving means 300, a first conveying means 301B and a corresponding first idle wheel 201A, a second conveying means 301C and a corresponding second idle wheel 201B, and two belts 303, 304 which respectively drive the first and second conveying means. A fixed stand 400 is mounted on the weighing scale 500 for supporting the mail to be weighed, and a movable stand 200 is mounted on a main shaft 101 of the idle wheels 201A, 201B in a position slightly higher than the fixed stand 400 for the convenience of mail conveyance. An opening (not shown) is formed on central portion of the movable stand 200 above the weighing scale 500 so that when the movable stand 200 descends along with the idle wheels 201A, 201B, the fixed stand 400 mounted on the weighing scale 500 can go through the opening, permitting the movable stand 200 to smoothly descend, making the mail placed on the fixed stand 400 weighed under a condition wherein no other load exists (as shown in FIG. 8D).

Figure 8A:
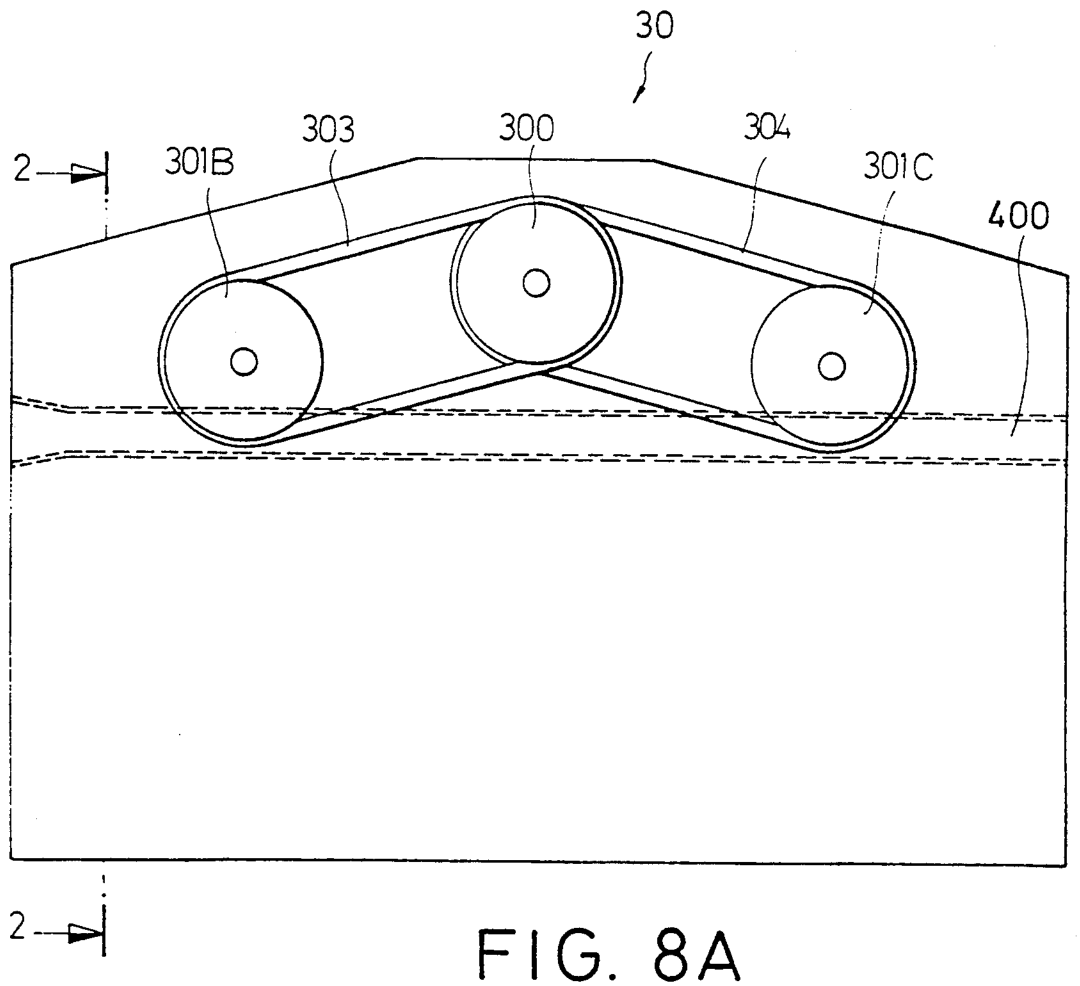
FIGS. 8A through 8D show another embodiment of the automatic weighing device of this invention and the weighing operation thereof.
Figure 8B:
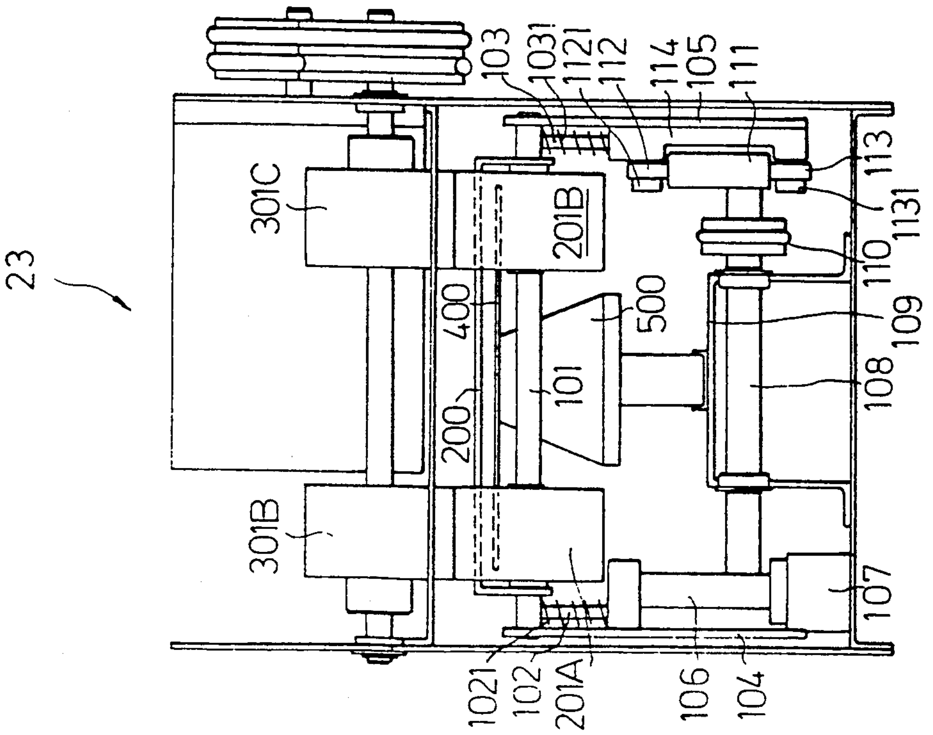
Figure 8C:
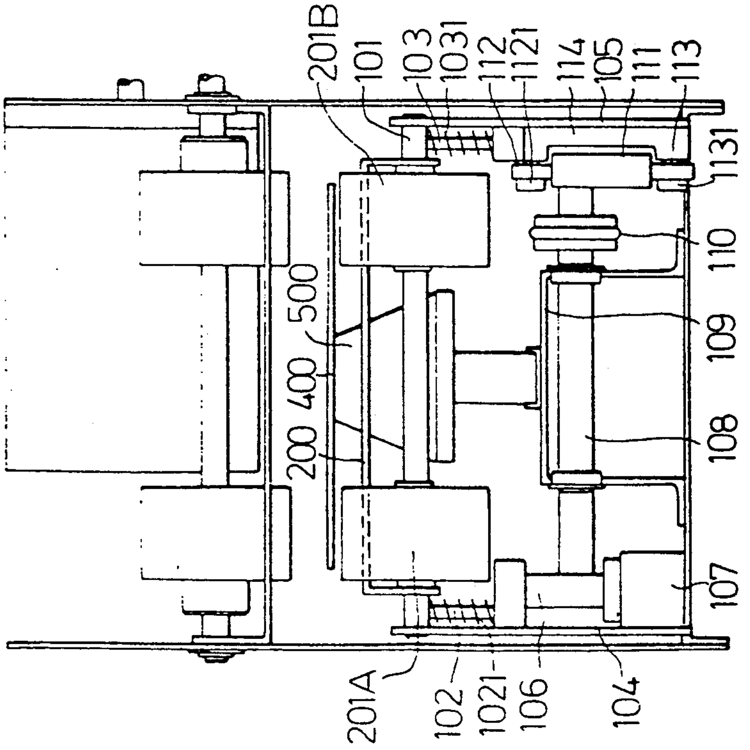
Figure 8D:
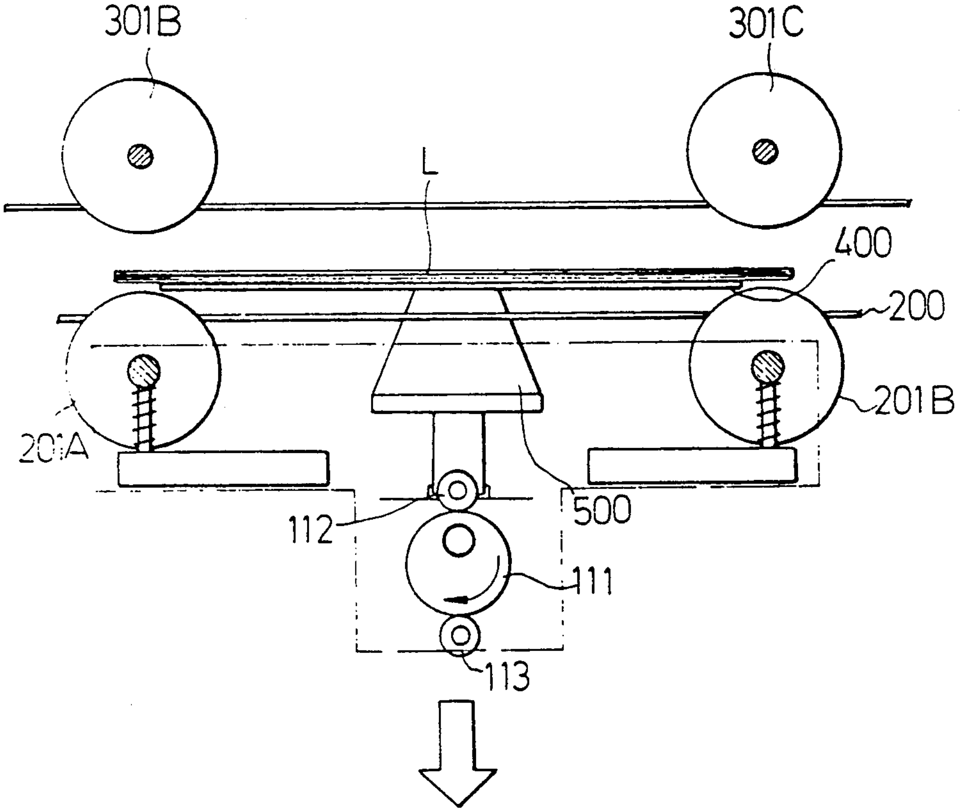

Two ends of the main shaft 101 of the idle wheels 201A, 201B are respectively fixed to two side boards 104, 105. A screw rod 102 is disposed in parallel with inner face of the side board 104 with its one end extended through the main shaft 101 and its other end of fixed to a vertically telescopic guide rod 106. The guide rod 106 is further mounted on a journal 107. A cam shaft 108 is transversely disposed through the guide rod 106, a weighing scale base 109, a drive wheel 110 and a cam 111. Two follower wheels 112, 113 are disposed respectively above and below the cam 111. Two shafts 1121, 1131 of the follower wheels are fixed to two ends of a fixed support 114. A screw rod 103 is further disposed between the fixed support 114 and main shaft 101. Two springs 1031, 1021 are respectively disposed on the screw rods 103, 102 for holding the main shaft 101 in place. According to the above arrangement, when a letter is dropped into the mail drop, the driving means 300 drives the first conveying means 301B, first idle wheel 201A, second conveying means 301C and second idle wheel 201B so as to carry the letter to upper side of the weighing scale 500 (as shown in FIG. 8B). By means of a sensor (not shown) which detects the movement of the mail, the drive wheel 110 is rotated to rotarily drive the cam shaft 108 and cam 111. As a result, the follower wheels 112, 113 descend, making the fixed support 114 together with side board 105, main shaft 101 and idle wheel 201B descend. The guide rod 106 disposed at other end of the cam shaft 108 will be forced down into the journal 107 due to rotation of the cam shaft, making the other end of main shaft 101 and idle wheel 201A descend together to achieve balance of two end for weighing the mail (as shown in FIGS. 8C and 8D). When the weighing is completed, the drive wheel 110 will rotate clockwise or counterclockwise, making the idle wheels 201A, 201B and movable stand 200 return to their home positions. The driving means 300 will continuously operate to send the mail to next position for successive processing.

It should be noted that the letter L is weighed during conveyance so that when the letter L goes into weighing position, the movable stand 200 is given a command to descend and temporarily separate from the automatic conveying device so that the letter L will be simply placed on the stand without touching other portion. After the weighing is completed, the separated stand 200 will return to its home position automatically for further conveying operation. The weight signal will be then input into microprocessor 10 through interface circuit 12 (see FIG. 1).

Figure 9:
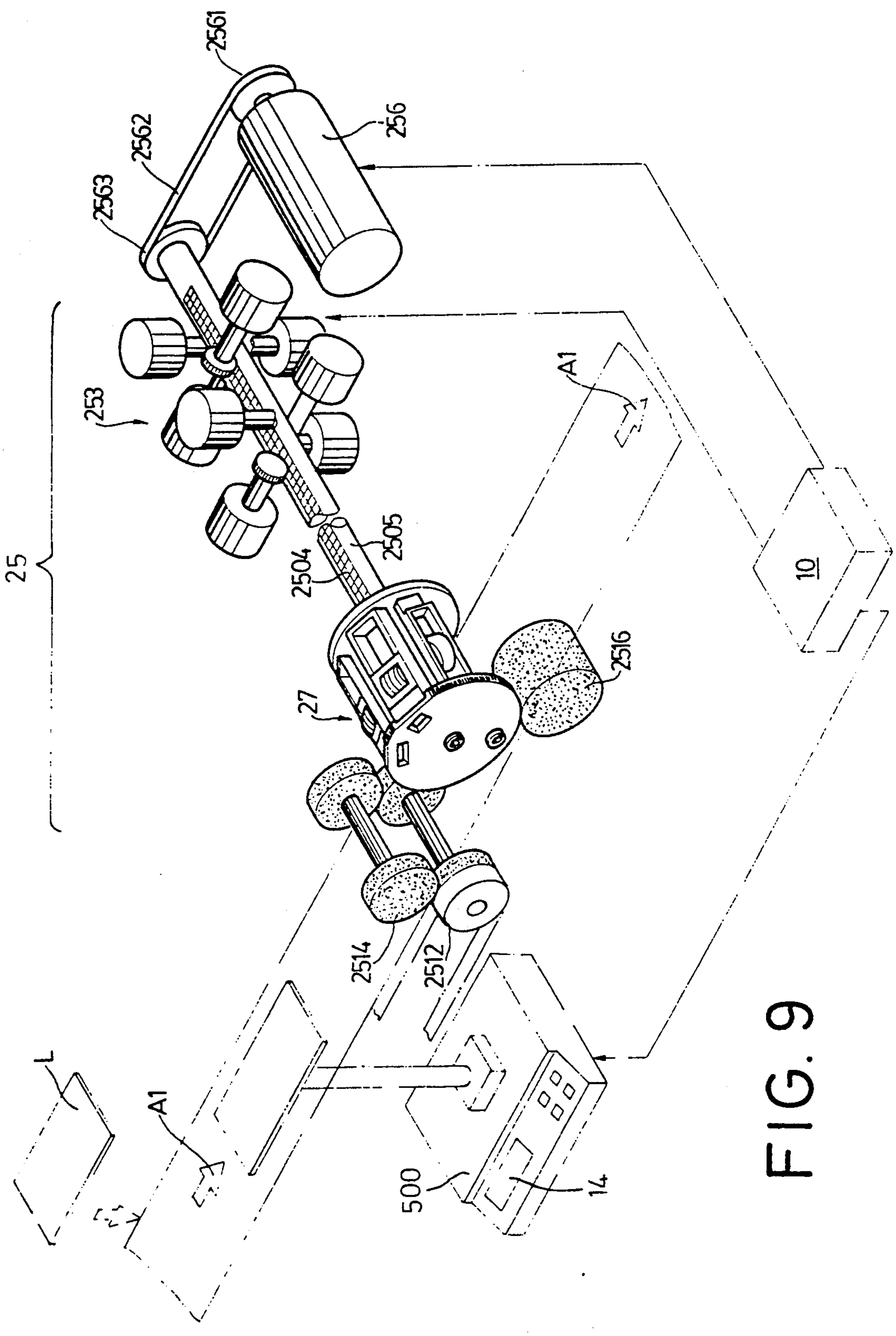
FIG. 9 is a perspective view of the automatic postal stamp device of the present invention.
Figure 10:
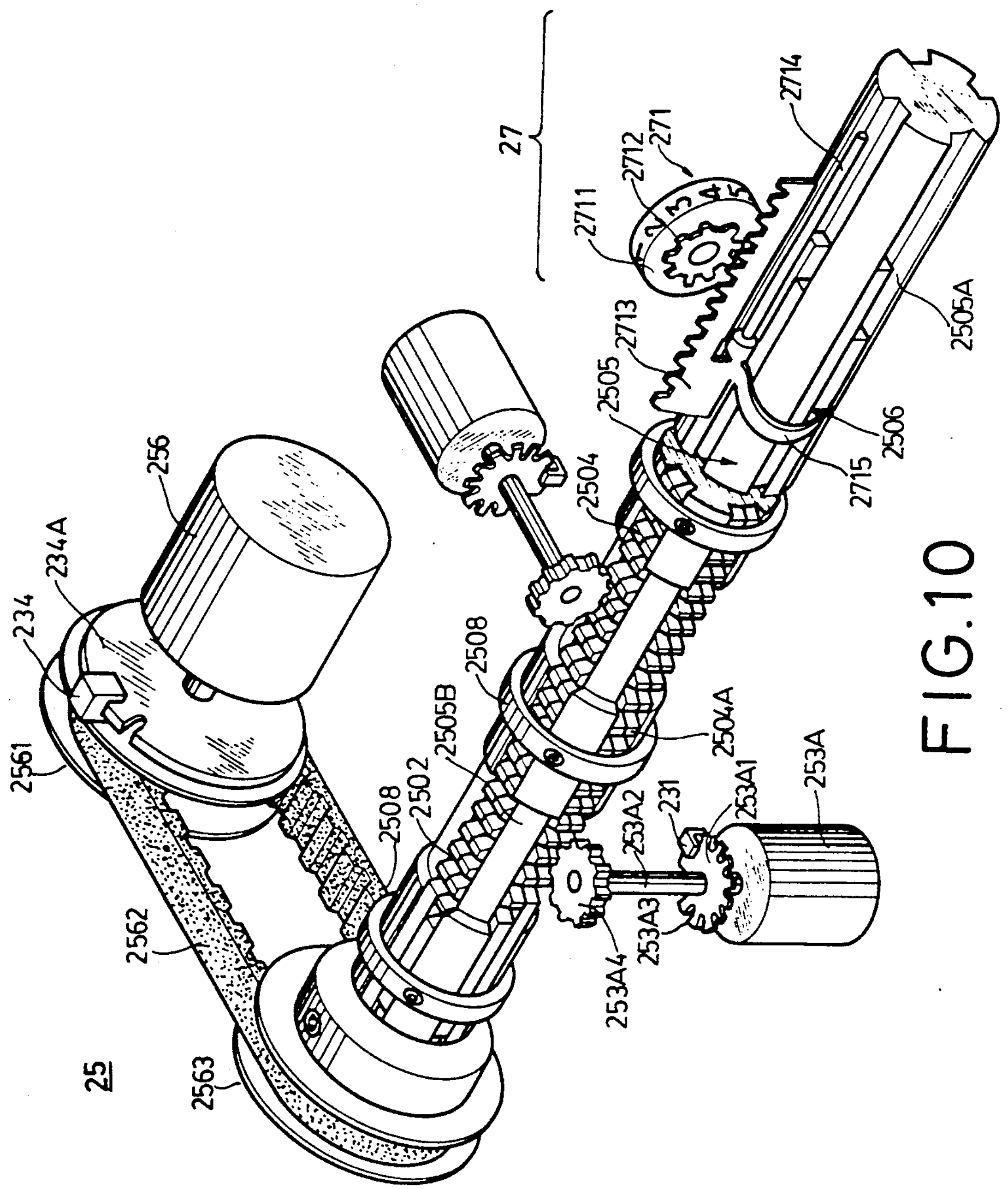
FIG. 10 is a perspective view of the driving system of the postal stamp device of this invention.
Figure 11:
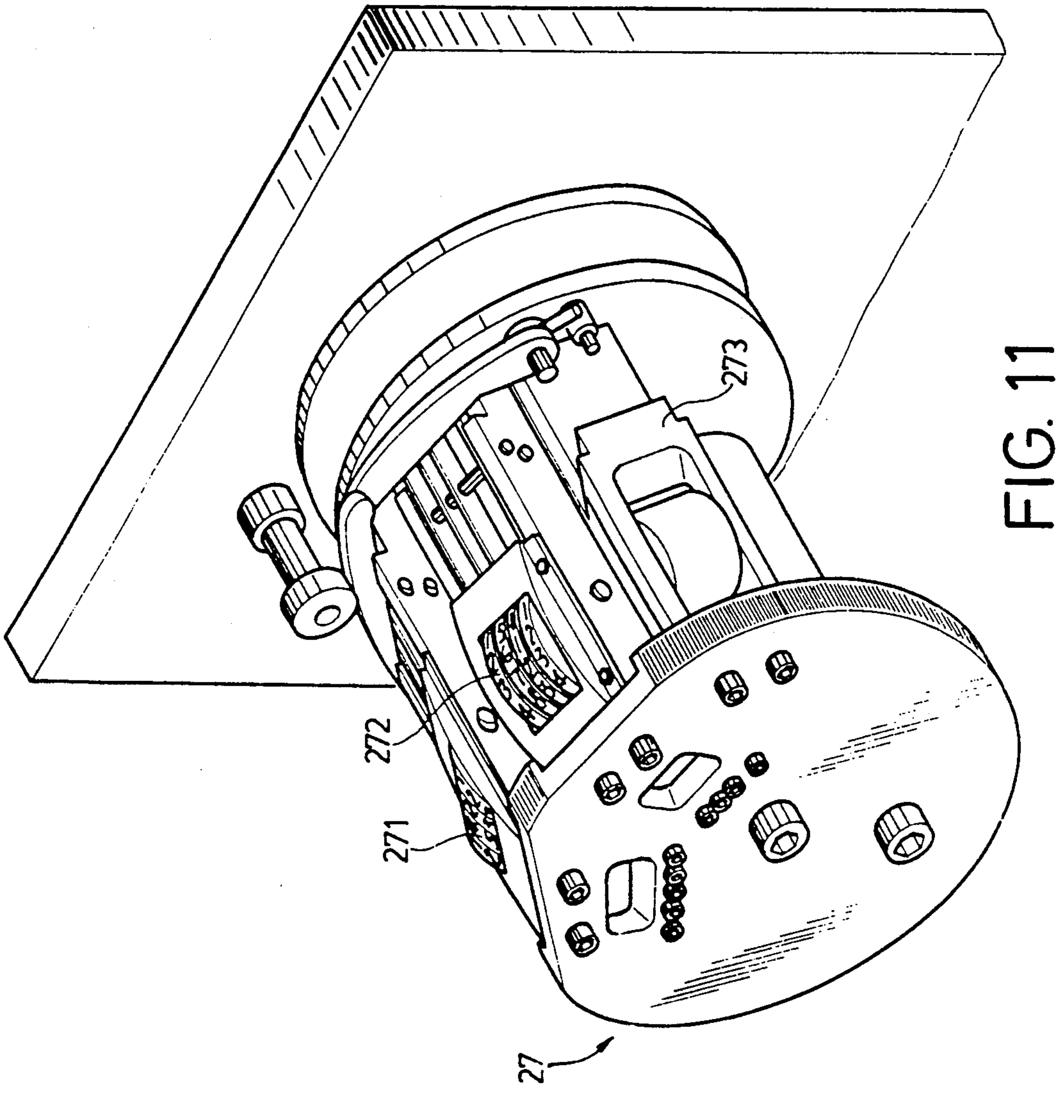
FIG. 11 is a perspective view of the printing head of postal stamp device thereof.
Figure 12:
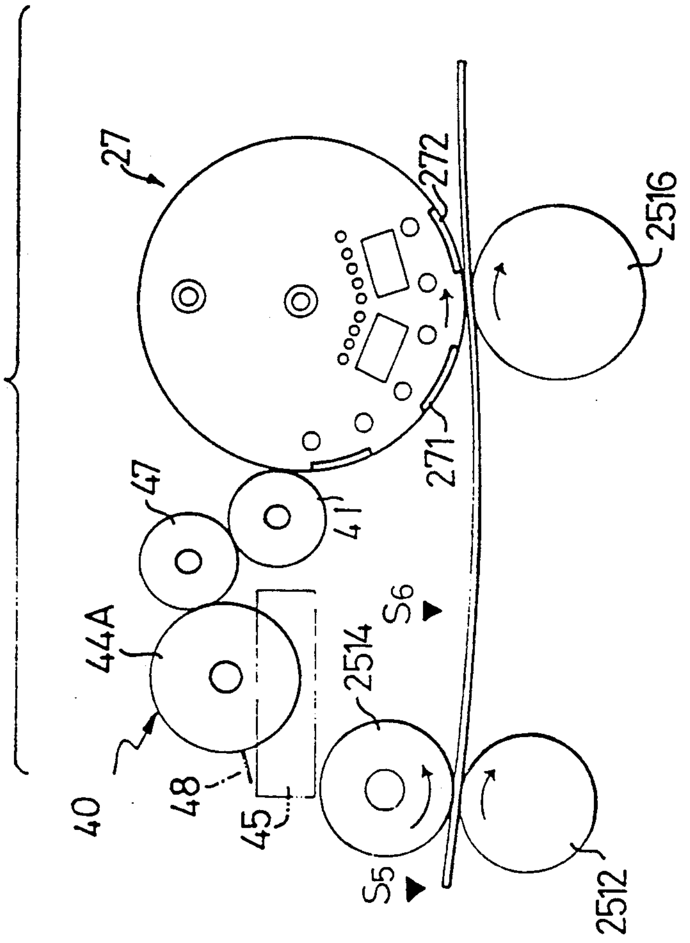
FIG. 12 is a side view of the postal stamp device, showing the operation thereof.

Turning now to FIGS. 9 to 12, an embodiment of the postage stamp device 25 of this invention is shown. The printer 25 includes a conveying system and a postmark printing system wherein the conveying system is arranged above and below a conveying reference surface A1, including a main driving means and first driving means, e.g., motor 251 of the conveying system, and a first roller 2512 driven through a timing belt 2510 (not shown). Referring to FIGS. 9 and 12, there are installed an idle roller 2514 with a stretching spring (not shown) above the first roller 2512. The postage stamp device 25 is shown in FIGS. 9 and 10, including a main shaft driving means 256, pulleys 2561, 2563, a timing belt 2562, a main shaft 2505, on which a plurality of second racks 2504 are slidably mounted, a plurality of stepper motors 253A, . . . 253H for driving their respective numeral wheels 271, 272 through their respective related gears means 253A4 . . . 253H4, ink-printing means 40, a printing head 27, and an idle roller 2516 thereof (see FIGS. 9, to 12). The printing head 27, as seen in FIG. 11, includes a postmark wheel means 271 for imprinting postage, a postmark wheel means 272 for imprinting accepted date, a graphical postmark means 273 for imprinting advertising marks.

Referring to FIG. 10, the postmark wheel means 271 further comprises a numeral wheel 2711, a gear 2712 attached therewith, a first rack 2713 engaged with the gear 2712, a guiding bar 2714 for the rack 2713 to move thereon, and a hooking arm 2715. The lower end of the hooking arm is secured to a recess 2506 of a second rack 2504. In order to restore the main shaft 2505 to its home position after the completion of postmarking, an encoder 234A and a main driver sensor 234 are disposed near the driving portion of the second stepper motor 256. Similarly, in order to assure that the stepper motor 253A properly drives the corresponding character wheel 2711, an encoder 253A1 and a first wheel driver sensor 231 are disposed thereon.

Prior to the entering of postal material into the conveying system, the printing head 27 is zeroed to its home position (not shown) wherein a motor 251 is the prime driving source of the conveying system. As shown in FIG. 12, disposed between the first roller 2512 and printing head 27 is a sensor S6 whereby after a postal material L passes through the sensor S6, the CPU 10 will actuatè the printing head 27. Below the printing head 27 is a third idle wheel 2516 with stretching spring in order that the postal material L has a close contact with the numeral wheel 271 of the printing head 27, as shown in FIG. 12.

As to the inking to be applied to the numeral wheel 271, it will be carried out by a printing ink means 40, as shown in FIG. 12. The ink means 40 includes an ink tank 45, a first roller 44A, a second roller 47, a third roller 41 and an adjusting means 48. The ink means 40 pertains to prior art and the description thereof is therefore omitted herein.

As can be seen in FIG. 12, when the postal material L is forwarded to be printed by the printing head 27, due to the spring effect of the first and second, idle wheels 2514, 2515, the printing effect is equally excellent regardless of the thinkness of the printed postal material. This should be considered as an advantage of this invention over prior art.

The disclosure thus far is made only with respect to a printing head with one numeral wheel, in practical operation, however, the device works with four numeral wheels or more arranged as two or more parallel sets, wherein one set functions as date numeral wheel, the other as postal charge numeral wheel, as shown in FIG. 11. Various arrangement between a plurality of stepper motors 253A–253F and their related second racks 2504A–2504F for each set of character wheels can be easily arranged. As can be understood, more character wheels mentioned above can be arranged in accordance with the need.

It should be noted that a relatively smaller diameter portion 2505B of the main shaft 2505 of the printing head is in alignment with that where the driving gear 253A4 is located, as shown in FIG. 10. It will be seen from the drawing, the outer perimeter of the relatively smaller diameter portion 2505B, just comes flush with the dented base 2502 of the second rack 2504, so that after respective stepper motors 253A–253N are located at their proper positions and the main shaft 2505 of the printing head rotates, the second racks 2504 and the relatively smaller diameter portions 2505B can slip through the driving gear 253A4. In other words, the second rack 2504 for driving the character wheels of the printing head 27 can slide axially along the main shaft 2505, and also can rotate together with the main shaft 2505 after reaching its proper position, thus smoothing the work of the printing head 27 and reducing the very complicated machanism as needed in the cases of prior art work. This should also be concluded as one of the most important feature of this invention.

Figure 13:
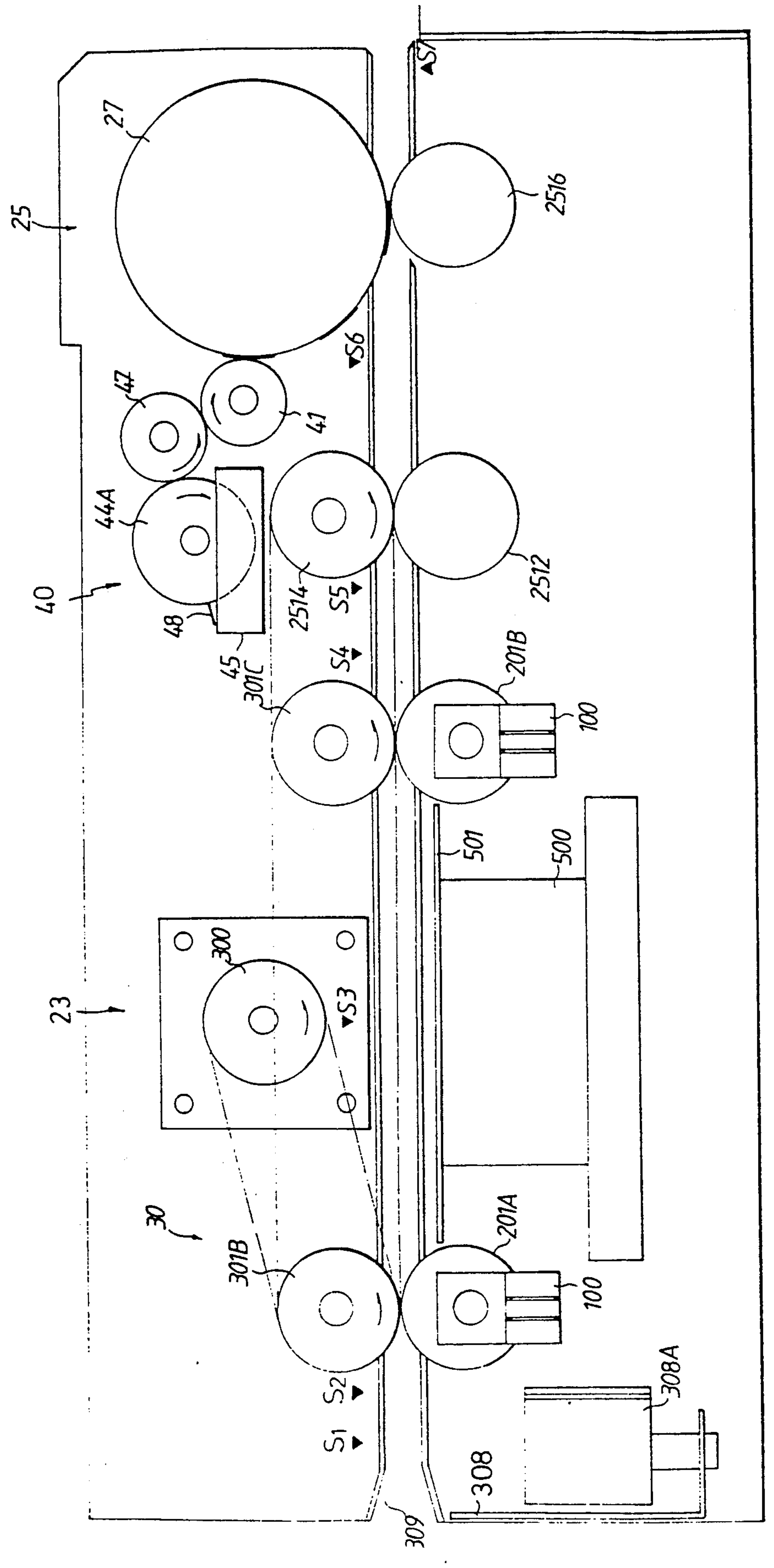
FIG. 13 shows the operation of the united main portions of this invention.

Please now refer to FIG. 13, which illustrates the operation of the present invention. The present invention essentially includes the automatic weighing device 23 and automatic postage stamp device 25, which have been described in preceding paragraph.

It should be noted that to prevent mails with abnormal length from affecting the normal operation of the present invention, a set of sensors S1 to S5 are provided whereby when a mail enters the system and is sensed by sensor S1, and the driver 300 consequently rotates to convey the mail forward, if sensor S2 senses the mail while sensor S3 does not, thus indicating an item to short for the system, then the driver 300 will reversely rotate to reject the mail. Moreover, when sensor S5 senses the mail while sensor S1 remains in sensing condition, the item is too long for the system and the driver 300 also reversely rotates to reject the mail. Therefore, mails not meet length regulation will be removed in advance. This arrangement is a characteristic of the present invention.

I claim:

1. An automatic postal teller machine comprising:

a housing having a front face, a mail drop, mail returning opening, coin slot and coin returning opening;

a microprocessor for controlling said teller machine disposed inside said housing;

a keyboard system operatively connected to said microprocessor for inputting operation commands to said microprocessor;

a display disposed on said front face of said housing and operatively connected to said microprocessor for communicating with the mailer;

an automatic weighing device operatively connected to said microprocessor for receiving the mail dropped from the mail drop and conveying the mail to a weighing area for weighing, said automatic weighing device including an automatic conveying means, a weighing scale and a movable and vertically displaceable stand for supporting the mail, the mail being completely separated from said conveying means when the mail is weighed by said weighing scale, wherein said microprocessor calculates postage due according to said operation commands and the weight of the mail;

an automatic postal stamp device adjacent to said automatic weighing device, having postage stamp numeral wheel means and date stamp numeral wheel means; and a money receiving means disposed behind said coin slot for receiving the postage paid by the mailer.

2. A teller machine as claimed in claim 1, wherein said microprocessor includes a display interface circuit, a weighing device interface circuit, a money identifying device interface circuit, a coin changing device interface circuit, a key-in system interface circuit, an automatic conveying device interface circuit, and a postal stamp device interface circuit.

3. A teller machine as claimed in claim 1, further comprising a mail classifying device disposed behind said postal stamp device and a mail classifying device interface circuit disposed in said microprocessor.

4. A teller machine as claimed in claim 1, further comprising a printer used to print out postage receipt and release the same after the mailer completes the mailing operation, said printer also being used to print out operation state of said teller machine according to commands, a printer interface circuit being added to said microprocessor.

5. A teller machine as claimed in claim 1, wherein said money receiving device includes a money identifying device and coin changing device, and a money identifying device interface circuit and coin changing device I/F circuit are disposed in said microprocessor so that the mailer can directly use coins to pay the postage.

6. A teller machine as claimed in claim 1, wherein said money receiving device includes a card reader/-writer, and an asynchronous interface circuit is added to said microprocessor so that the mailer can use magnetic money card to pay the postage.

7. A teller machine as claimed in claim 1, further comprising a modem and remote host, and a host interface circuit is added to said microprocessor so that a monitor center of general post office can control the working state of said teller machine.

8. A teller machine as claimed in claim 1, wherein said keyboard system includes a set of mail classifying keys, a set of district keys, a mail returning key, a coin returning key, a changing key, a money card key and a hold-on key.

9. A teller machine as claimed in claim 1, wherein said postage stamp device is on line connected to said microprocessor via a parallel bus interface circuit and postage stamp device interface circuit.

10. A teller machine as claimed in claim 1, wherein said automatic weighing device is on line communicated with said microprocessor through a weighing device interface circuit.

11. A teller machine as claimed in claim 10, wherein said automatic weighing device further includes an automatic conveying device on line connected to said microprocessor via a parallel bus interface circuit and an automatic conveying device interface circuit.

12. A teller machine as claimed in claim 1, wherein a mail length sensing means is added to said automatic conveying device so as to sense too long or too short mails and return the same so that mails with irregular length can be excluded.

13. A teller machine as claimed in claim 1, wherein said postage stamp device includes a postage stamp device control switch, postage stemp device control unit, sensor, sensor circuit thereof, sensor interface circuit thereof, driver, driver circuit thereof and driver interface circuit thereof.

14. A teller machine as claimed in claim 1, wherein said automatic conveying device includes an automatic conveying device control switch, automatic conveying device control unit, sensor, sensor circuit thereof, sensor interface circuit thereof, driver, driver circuit thereof, and driver interface circuit thereof.

15. A teller machine as claimed in claim 1, wherein said automatic weighing device includes an automatic conveying device and a weighing means wherein said conveying device includes a driving means, a first conveying means, a corresponding first idle wheel, a second conveying means, a corresponding second idle wheel, a fixed stand, a movable stand under which said weighing means is located, a first sensor located before said first conveying means and a second sensor located after said second conveying means.

16. A teller machine as claimed in claim 15, wherein said movable stand includes a supporting stand with a rectangular opening in a middle portion thereof, at both ends of said opening, there being disposed said first and second idle wheels which are in cooperative relationship with said first and second conveying means respectively to convey a mail to be weighed.

17. A teller machine as claimed in claim 15, wherein a pair of front and rear rocking arms are further provided under said movable stand, each of said rocking arms including a movable end pivotally connected to each end of said movable stand, and the other end of each rocking arm is pivoted on a pivot whereby a pair of electromagnetic actuators are connected to a middle portion of said front rocking arm so that when said electromagnetic actuator is activated, said movable end of each said rocking arm is pulled down with said pivot as a fulcrum, and since said movable stand is attached to said movable ends of both said rocking arms, said movable stand descends together therewith to a lower level, permitting a mail placed thereon to be weighed by said weighing means without contacting any other portion, and after weighing, said rocking arms return to their home positions, permitting the mail to be conveyed by said first and second conveying means into a postage stamping area of said postage stamp device.

18. A teller machine as claimed in claim 15, wherein said supporting stand of said conveying device receives commands from said microprocessor to descend and separate from said conveying device, permitting a mail to be placed on said movable stand and weighed by said weighing means without contacting any other portion, and after weighing, said supporting stand returns to its home position automatically.

19. A teller machine as claimed in claim 1, wherein said automatic postal stamp device includes:

a main shaft capable of rotating within a certain angle;

a main shaft driving means disposed on a first end of said main shaft;

a main shaft driving means sensor means used to locate said main shaft;

a printing head means disposed on a second end of said main shaft, including plural numeral wheels;

a numeral wheel driving means used to drive said numeral wheels; and a sensor means used to locate said numeral wheels.

20. A teller machine as claimed in claim 19, wherein said head means of said automatic postal stamp device includes:

a main shaft on which a plurality of axial grooves are formed, said main shaft being disposed in a direction perpendicular to conveying direction of a mail;

a main shaft driving means including a driving motor, a transmitting means and an encoder means wherein said driving motor is engaged with a first end of said main shaft via said transmitting means;

a printing head disposed on a second end of said main shaft whereby when relevant date of a mail are input via said key board system, said microprocessor commands driving gear of a set of second rocks slidably disposed on said grooves of said main shaft to control travels of said second racks and consequently control rotation angles of said numeral wheel to set numeral wheels into required positions whereby when a mail enters a printing area of said postage stamp device, said main shaft driving means is commanded to rotate said main shaft one turn to imprint set postage, date or relevant marks of said numeral wheels on the mail, the mail being further sent to a subsequent processing device thereafter and said numeral wheels being zeroed for next printing cycle.

21. A teller machine as claimed in claim 19, wherein said printing head includes at least one settable numeral wheel means, and said numeral wheel means includes at least two independent numeral wheels, and each said numeral wheel has a synchronic gear driven by a corresponding first rack disposed outside said main shaft, said first rack being formed with a hooking arm at its lower end, said hooking arm being capable of engaging with a first end of said second rack.

22. A teller machine as claimed in claim 19, wherein said printing head further includes a separate encoder disposed near a second end of said second rack for controlling travel of said second rack, the travel of said second rack being completely controlled by programs of said microprocessor.

23. A teller machine as claimed in claim 19, wherein a small diameter portion is formed on said main shaft in alignment with said driving gear of said second rack, just coming flush with dented base of said second rack so that when said printing head together with said main shaft are rotated, said relatively smaller diameter portion can slip through said driving gear.

24. A teller machine as claimed in claim 1, wherein a bar code reader is added to read ZIP code which is shown on the mail envelope and then a bar code printer is to print zip code on the mail envelope.

25. A teller machine as claimed in claim 1, wherein said automatic weighing device includes an automatic conveying device and a weighing means, said automatic conveying device further including a driving means, a first conveying means, a corresponding first idle wheel, a second conveying means and a corresponding second idle wheel, said weighing emans further including an electronic weighing scale with a weighing unit, a movable stand disposed on a main shaft of said idle wheels, a drive wheel driving said movable stand, a cam, a support, a guide rod, a journal, a first location sensing means, disposed in front of said first conveying means, and a second location sensing means disposed behind said second conveying means.

26. A teller machine as claimed in claim 25, wherein two ends of said movable stand are fixedly mounted on said main shaft of said two idle wheels to that said movable stand can vertically move together with said main shaft, an opening being formed on central portion of said movable stand so that when said movable stand descends, a fixed stand mounted on said weighing scale can go through said opening, permitting said movable stand to move to a position lower than said fixed stand.

27. A teller machine as claimed in claim 25, wherein two ends of said main shaft of said idle wheels are respectively fixed to two side boards, and two screw rods are disposed in parallel with inner faces of said side boards, one of said two screw rods having one end extended through said main shaft with its other end fixed to a vertically telescopic guide rod, said guide rod being further mounted on a journal, the other screw rod having one end extended through said main shaft with its other end fixedly mounted on a vertically movable support, a cam shaft being transversely disposed through said drive wheel and a scale support with its two ends respectively fixed on said cam and guide rod, whereby said drive wheel can rotarily drive said cam shaft and cam, making said support disposed above said cam and a guide rod mounted on other end of said main shaft descend or ascend together to achieve balance of two ends, said idle wheels and movable stand vertically moving together, two springs being respectively disposed on said screw rods for holding said main shaft in place.

28. A teller machine as claimed in claim 25, wherein two follower wheels are disposed respectively above and below said cam, and two shafts of said follower wheels are fixed to two ends of said support, whereby when said cam rotates, said follower wheels will consequently move up and down to therefore vertically drive said support up and down.

29. A teller machine as claimed in claim 25, wherein when said movable stand descends, the mail placed on said fixed stand will separate from said conveying device without touching any part thereof, whereupon the mail is placed on said weighing scale and accurately weighed.

* * * * *